(12) United States Patent
Kim et al.

(10) Patent No.: US 11,974,048 B2
(45) Date of Patent: Apr. 30, 2024

(54) CAMERA DEVICE AND ELECTRONIC APPARATUS INCLUDING THE SAME

(71) Applicant: LG ELECTRONICS INC., Seoul (KR)

(72) Inventors: Sangjin Kim, Seoul (KR); Donghoon Lee, Seoul (KR); Wonseok Kang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 267 days.

(21) Appl. No.: 17/424,346

(22) PCT Filed: Jan. 21, 2020

(86) PCT No.: PCT/KR2020/001043
§ 371 (c)(1),
(2) Date: Jul. 20, 2021

(87) PCT Pub. No.: WO2020/153726
PCT Pub. Date: Jul. 30, 2020

(65) Prior Publication Data
US 2022/0078329 A1    Mar. 10, 2022

(30) Foreign Application Priority Data
Jan. 21, 2019    (KR) .................. 10-2019-0007249

(51) Int. Cl.
*H04N 23/741*    (2023.01)
*H04N 9/68*    (2023.01)
(Continued)

(52) U.S. Cl.
CPC ............. *H04N 23/741* (2023.01); *H04N 9/68* (2013.01); *H04N 9/77* (2013.01); *H04N 23/10* (2023.01); *H04N 23/90* (2023.01)

(58) Field of Classification Search
None
See application file for complete search history.

(56) References Cited

U.S. PATENT DOCUMENTS 4,695,884 A * 9/1987 Anastassiou ........... H04N 1/403
358/461
2005/0207641 A1* 9/2005 Bala ....................... H04N 5/208
348/E5.076

(Continued)

FOREIGN PATENT DOCUMENTS

KR    10-1365369 B1    3/2014
KR    10-2014-0066771 A    6/2014
(Continued)

*Primary Examiner* — Mark T Monk
(74) *Attorney, Agent, or Firm* — Birch, Stewart, Kolasch & Birch, LLP

(57) ABSTRACT

The present disclosure relates to a camera device, and an electronic apparatus including the same. The camera device and an electronic apparatus including the same according to an embodiment of the present disclosure a color camera; and a processor configured to receive a first color pattern image from the color camera, generate a grayscale-based transmission map based on the first color pattern image, and generate a high dynamic range color image based on the grayscale-based transmission map. Accordingly, it is possible to generate the high dynamic range color image based on the color pattern image obtained from the color camera.

14 Claims, 32 Drawing Sheets

(51) Int. Cl.
    *H04N 9/77*     (2006.01)
    *H04N 23/10*    (2023.01)
    *H04N 23/90*    (2023.01)

(56) References Cited

U.S. PATENT DOCUMENTS

2012/0141026 A1*  6/2012  Yoon .................... H04N 19/30
                                                                         382/167
2014/0140615 A1*  5/2014  Finlayson ............... G06T 5/009
                                                                         382/167
2017/0289515 A1* 10/2017  Li ........................ H04N 23/743
2018/0337082 A1* 11/2018  Krishna ............ H01L 21/02507

FOREIGN PATENT DOCUMENTS

| KR | 10-2014-0093079 A | 7/2014 |
| KR | 10-1468433 B1 | 12/2014 |
| KR | 10-2015-0068833 A | 6/2015 |
| KR | 10-2018-0045338 A | 5/2018 |

* cited by examiner

100m

FIG. 5A
(a) 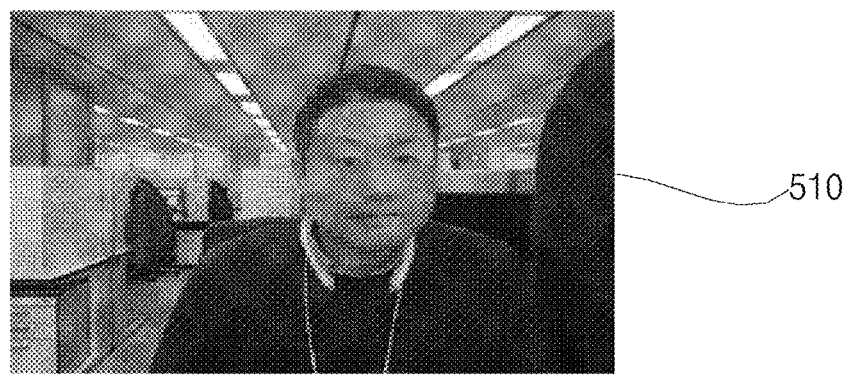
(b) 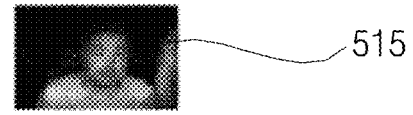

FIG. 5B
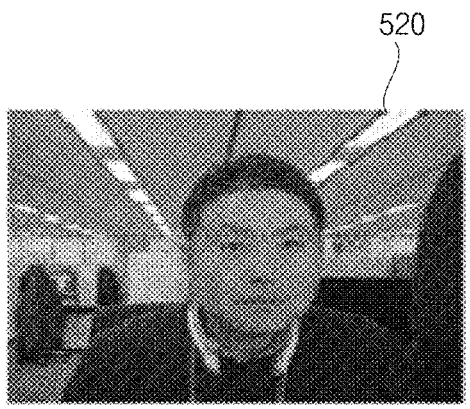
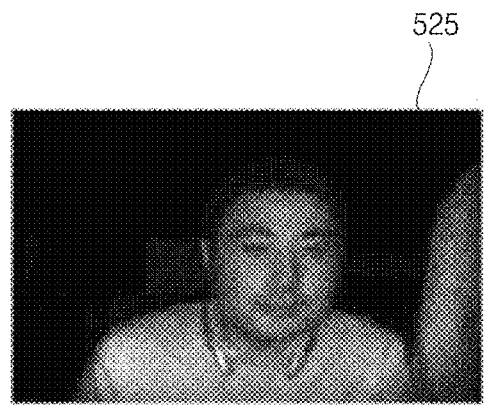

FIG. 10D
(a) 
(b) 

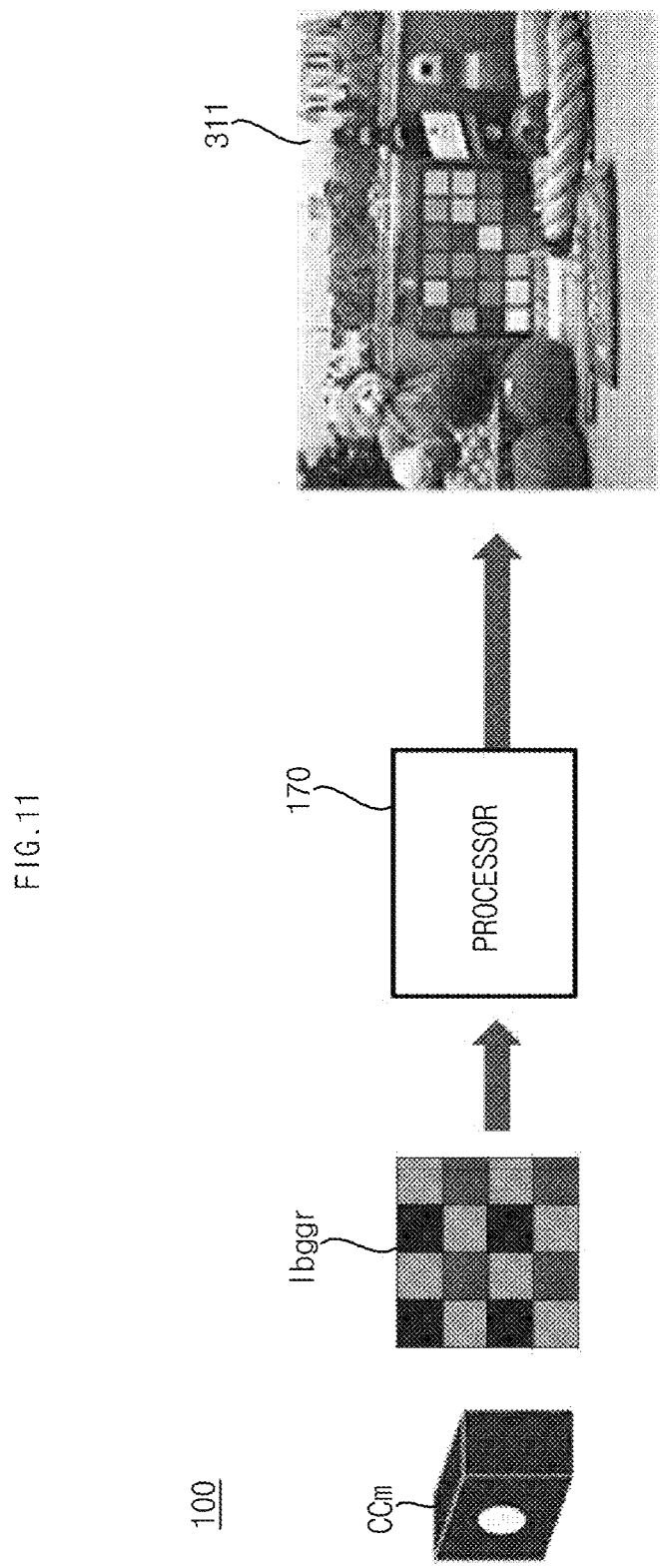

FIG. 15A
(a)
(b)

FIG. 15B
(a)
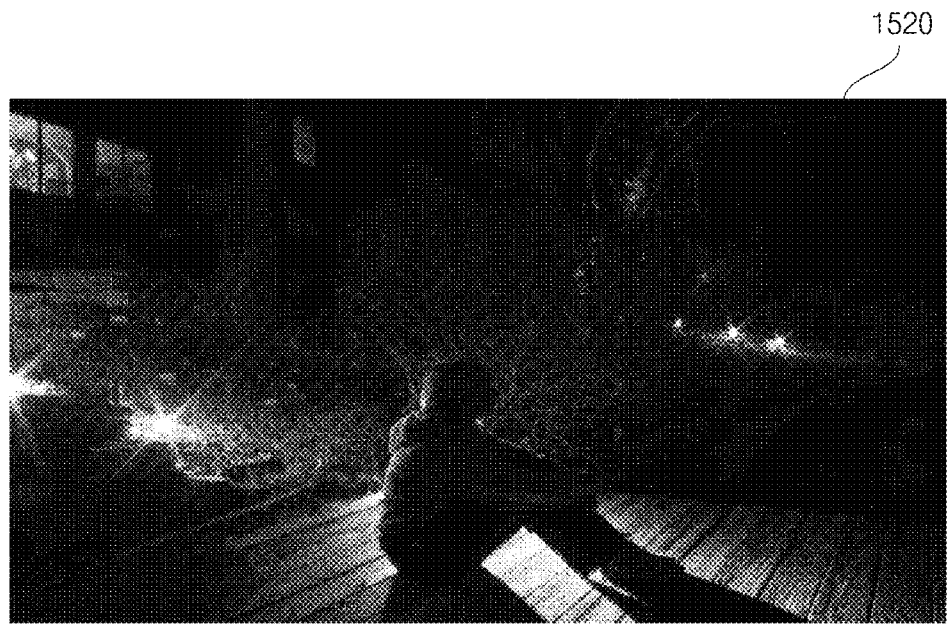
(b)

FIG. 15C
(a)
(b)

FIG. 15D
(a)
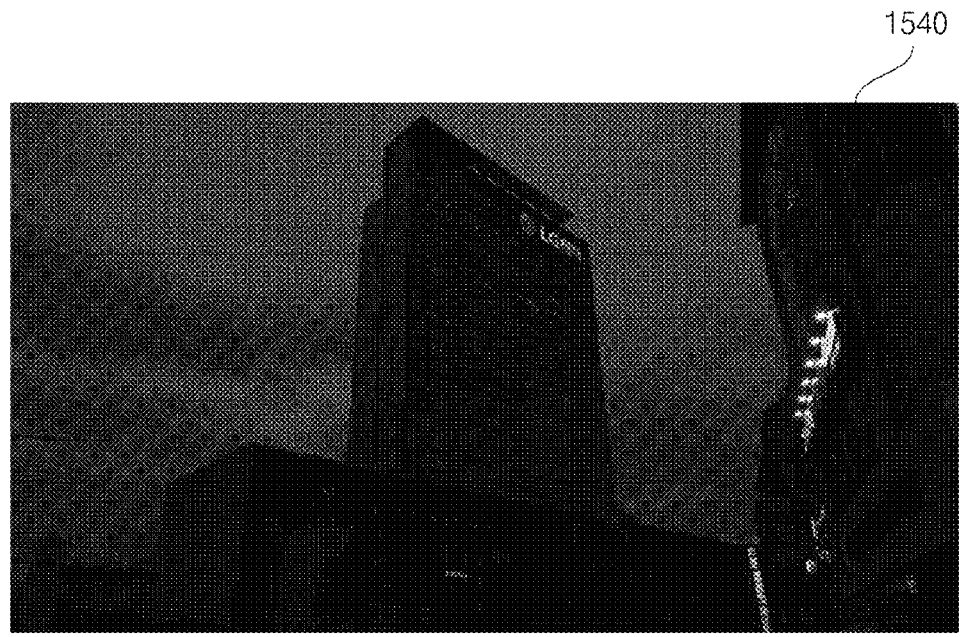
(b)

CAMERA DEVICE AND ELECTRONIC APPARATUS INCLUDING THE SAME

CROSS REFERENCE TO RELATED APPLICATIONS

This application is the National Phase of PCT International Application No. PCT/KR2020/001043, filed on Jan. 21, 2020, which claims priority under 35 U.S.C. 119(a) to Patent Application No. 10-2019-0007249, filed in the Republic of Korea on Jan. 21, 2019, all of these applications being hereby expressly incorporated by reference into the present application.

BACKGROUND OF THE DISCLOSURE

1. Field of the Disclosure

The present disclosure relates to a camera device and an electronic apparatus including the same, and more particularly, to a camera device capable of generating a high dynamic range color image based on a color pattern image obtained from a color camera, and an electronic apparatus including the same.

2. Description of the Related Art

A camera device is an image capturing device. Recently, cameras are employed in various electronic devices.

Meanwhile, an image quality processing may be required for a color image obtained from a camera device, for which a separate signal processing may be required.

For example, the signal processing may be required to secure a dynamic range of the color image obtained from the camera device.

SUMMARY

The present disclosure provides a camera device capable of generating a high dynamic range color image based on a color pattern image obtained from a color camera, and an electronic apparatus including the same.

It is another object of the present disclosure to provide a camera device having no bracket in the color camera and the IR camera, and an electronic apparatus including the same.

In an aspect, a camera device includes: a color camera; and a processor configured to receive a first color pattern image from the color camera, generate a grayscale-based transmission map based on the first color pattern image, and generate a high dynamic range color image based on the grayscale-based transmission map.

Meanwhile, the processor may be configured to generate the grayscale-based transmission map based on the first color pattern image, generate a second color pattern image based on the transmission map, and generate the high dynamic range color image based on the second color pattern image.

Meanwhile, the processor may be configured to generate a grayscale-based luminance contrast map based on the first color pattern image or the transmission map, generate the second color pattern image based on the luminance contrast map and the transmission map, and generate the high dynamic range color image based on the second color pattern image.

Meanwhile, the processor may be configured to generate grayscale-based first and second function characteristic maps based on the first color pattern image or the transmission map, generate a first function-based color pattern image and a second function-based color pattern image based on the first function characteristic map and the second function characteristic map, respectively, generate the second color pattern image based on the first function-based color pattern image and the second function-based color pattern image, and generate the high dynamic range color image based on the second color pattern image.

Meanwhile, the processor may be configured to generate a transmission map-based color pattern image based on the transmission map, generate the second color pattern image based on the first function-based color pattern image, the second function-based color pattern image and the transmission map-based color pattern image, and generate the high dynamic range color image based on the second color pattern image.

Meanwhile, the processor may be configured to perform luminance inversion on the first color pattern image, and generate the grayscale-based transmission map based on the luminance-inverted first color pattern image.

Meanwhile, the processor may be configured to perform luminance inversion and amplification on the first color pattern image, and generate the grayscale-based transmission map based on the luminance-inverted and amplified first color pattern image.

Meanwhile, it may be preferable that a resolution of the grayscale-based transmission map is less than a resolution of the first color pattern image.

Meanwhile, the processor may include: a transmission map generator configured to generate the grayscale-based transmission map based on the first color pattern image; a first function characteristic map generator and a second function characteristic map generator configured to generate grayscale-based first and second function characteristic maps, respectively, based on the first color pattern image or the transmission map; a first function-based color pattern image generator and a second function-based color pattern image generator configured to generate a first function-based color pattern image and a second function-based color pattern image, respectively, based on the first function characteristic map and the second function characteristic map; a second color pattern image generator configured to generate a second color pattern image based on the first function-based color pattern image and the second function-based color pattern image; and a high dynamic range (HDR) color image generator configured to generate the high dynamic range color image based on the second color pattern image.

Meanwhile, the processor may further include a transmission map-based color pattern image generator configured to generate a transmission map-based color pattern image based on the transmission map.

Meanwhile, the second color pattern image generator may generate the second color pattern image based on the first function-based color pattern image, the second function-based color pattern image and the transmission map-based color pattern image.

Meanwhile, the processor may be configured to receive the first color pattern image from the color camera, and generate the grayscale-based transmission map based on the first color pattern image, generate a plurality of pattern images having different exposure times based on the transmission map and a compensation map, generate a second color pattern image based on the plurality of pattern images having different exposure times, and generate the high dynamic range color image based on the second color pattern image.

Meanwhile, the processor may be configured to process each of the plurality of pattern images pixel-by-pixel when the pattern images are generated.

Meanwhile, the processor may include: a transmission map generator configured to receive the first color pattern image from the color camera and generate the grayscale-based transmission map based on the first color pattern image; a pixel processor configured to perform a signal processing on the pattern image pixel-by-pixel based on the transmission map and a compensation map, and generate a plurality of pattern images having different exposure times; a second color pattern image generator configured to generate a second color pattern image based on the plurality of pattern images having different exposure times; and a high dynamic range (HDR) color image generator configured to generate the high dynamic range color image based on the second color pattern image.

Meanwhile, the processor may be configured to compensate at least one of the high dynamic range color image or an IR image for based on the high dynamic range color image and the IR image obtained from the IR camera.

Meanwhile, the color camera and the IR camera are connected to each other by a connection member, and the connection member is flexible.

In another aspect, a camera device includes: a color camera; and a processor configured to receive a first color pattern image from the color camera, perform luminance inversion on the first color pattern image, and generate a high dynamic range color image based on the luminance-inverted first color pattern image.

Meanwhile, the processor may be configured to perform grayscale-based transmission based on the luminance-inverted first color pattern image, perform luminance inversion again on the transmitted first color pattern image, and generate the high dynamic range color image.

Meanwhile, the processor may be configured to perform grayscale-based transmission based on the luminance-inverted first color pattern image, generate a second color pattern image by performing the transmission, and generate the high dynamic range color image based on the second color pattern image.

Effects of the Disclosure

According to an embodiment of the present disclosure, there are provided a camera device and an electronic apparatus including the same. The camera device includes a color camera; and a processor configured to receive a first color pattern image from the color camera, generate a grayscale-based transmission map based on the first color pattern image, and generate a high dynamic range color image based on the grayscale-based transmission map. Accordingly, it is possible to generate the high dynamic range color image based on the color pattern image obtained from the color camera.

Meanwhile, the processor may be configured to generate the grayscale-based transmission map based on the first color pattern image, generate a second color pattern image based on the transmission map, and generate the high dynamic range color image based on the second color pattern image. Accordingly, it is possible to generate the high dynamic range color image based on the color pattern image obtained from the color camera.

Meanwhile, the processor may be configured to generate a grayscale-based luminance contrast map based on the first color pattern image or the transmission map, generate the second color pattern image based on the luminance contrast map and the transmission map, and generate the high dynamic range color image based on the second color pattern image. Accordingly, it is possible to generate the high dynamic range color image based on the color pattern image obtained from the color camera.

Meanwhile, the processor may be configured to generate grayscale-based first and second function characteristic maps based on the first color pattern image or the transmission map, generate a first function-based color pattern image and a second function-based color pattern image based on the first function characteristic map and the second function characteristic map, respectively, generate the second color pattern image based on the first function-based color pattern image and the second function-based color pattern image, and generate the high dynamic range color image based on the second color pattern image. Accordingly, it is possible to generate the high dynamic range color image based on the color pattern image obtained from the color camera.

Meanwhile, the processor may be configured to generate a transmission map-based color pattern image based on the transmission map, generate the second color pattern image based on the first function-based color pattern image, the second function-based color pattern image and the transmission map-based color pattern image, and generate the high dynamic range color image based on the second color pattern image. Accordingly, it is possible to generate the high dynamic range color image based on the color pattern image obtained from the color camera.

Meanwhile, the processor may be configured to perform luminance inversion on the first color pattern image, and generate the grayscale-based transmission map based on the luminance-inverted first color pattern image. Accordingly, it is possible to generate the high dynamic range color image based on the color pattern image obtained from the color camera.

Meanwhile, the processor may be configured to perform luminance inversion and amplification on the first color pattern image, and generate the grayscale-based transmission map based on the luminance-inverted and amplified first color pattern image. Accordingly, it is possible to generate the high dynamic range color image based on the color pattern image obtained from the color camera.

Meanwhile, the processor may include: a transmission map generator configured to generate the grayscale-based transmission map based on the first color pattern image; a first function characteristic map generator and a second function characteristic map generator configured to generate grayscale-based first and second function characteristic maps, respectively, based on the first color pattern image or the transmission map; a first function-based color pattern image generator and a second function-based color pattern image generator configured to generate a first function-based color pattern image and a second function-based color pattern image, respectively, based on the first function characteristic map and the second function characteristic map; a second color pattern image generator configured to generate a second color pattern image based on the first function-based color pattern image and the second function-based color pattern image; and a high dynamic range (HDR) color image generator configured to generate the high dynamic range color image based on the second color pattern image. Accordingly, it is possible to generate the high dynamic range color image based on the color pattern image obtained from the color camera.

Meanwhile, the processor may further include a transmission map-based color pattern image generator configured to generate a transmission map-based color pattern image based on the transmission map. Accordingly, it is possible to generate the high dynamic range color image based on the color pattern image obtained from the color camera.

Meanwhile, the second color pattern image generator may generate the second color pattern image based on the first function-based color pattern image, the second function-based color pattern image and the transmission map-based color pattern image. Accordingly, it is possible to generate the high dynamic range color image based on the color pattern image obtained from the color camera.

Meanwhile, the processor may be configured to receive the first color pattern image from the color camera, and generate the grayscale-based transmission map based on the first color pattern image, generate a plurality of pattern images having different exposure times based on the transmission map and a compensation map, generate a second color pattern image based on the plurality of pattern images having different exposure times, and generate the high dynamic range color image based on the second color pattern image. Accordingly, it is possible to generate the high dynamic range color image based on the color pattern image obtained from the color camera.

Meanwhile, the processor may be configured to process each of the plurality of pattern images pixel-by-pixel when the pattern images are generated. Accordingly, it is possible to generate the high dynamic range color image based on the color pattern image obtained from the color camera.

Meanwhile, the processor may include: a transmission map generator configured to receive the first color pattern image from the color camera and generate the grayscale-based transmission map based on the first color pattern image; a pixel processor configured to perform a signal processing on the pattern image pixel-by-pixel based on the transmission map and a compensation map, and generate a plurality of pattern images having different exposure times; a second color pattern image generator configured to generate a second color pattern image based on the plurality of pattern images having different exposure times; and a high dynamic range (HDR) color image generator configured to generate the high dynamic range color image based on the second color pattern image.

Meanwhile, the processor may be configured to compensate at least one of the high dynamic range color image or an IR image for based on the high dynamic range color image and the IR image obtained from the IR camera. Accordingly, it is possible to compensate for a difference between the color camera and the IR camera.

Meanwhile, the color camera and the IR camera may be connected by a connection member, wherein the connection member may be flexible. Accordingly, the camera device or the electronic apparatus in which the camera device 100 is mounted may have an improved degree of freedom of design.

In a camera device according to another embodiment of the present disclosure and an electronic apparatus including the same, the camera device includes: a color camera; and a processor configured to receive a first color pattern image from the color camera, perform luminance inversion on the first color pattern image, and generate a high dynamic range color image based on the luminance-inverted first color pattern camera.

Meanwhile, the processor may be configured to perform grayscale-based transmission based on the luminance-inverted first color pattern image, perform luminance inversion again on the transmitted first color pattern image, and generate the high dynamic range color image. Accordingly, it is possible to generate the high dynamic range color image based on the color pattern image obtained from the color camera.

Meanwhile, the processor may be configured to perform grayscale-based transmission based on the luminance-inverted first color pattern image, generate a second color pattern image by performing the transmission, and generate the high dynamic range color image based on the second color pattern image. Accordingly, it is possible to generate the high dynamic range color image based on the color pattern image obtained from the color camera.

BRIEF DESCRIPTION OF THE DRAWINGS

FIGS. 4A to 5C are diagrams referred to in the description of an operation of the camera device of FIG. 3B;

FIG. 11 is a diagram referred to in the description of the operation of the camera device according to an embodiment of the present disclosure;

FIGS. 13 to 17 are diagrams referred to in the description of the operating method of FIG. 12;

DETAILED DESCRIPTION OF THE PREFERRED EMBODIMENTS

Hereinafter, the present disclosure will be described in detail with reference to the accompanying drawings.

With respect to constituent elements used in the following description, suffixes "module" and "unit" are given only in consideration of ease in the preparation of the specification, and do not carry any important meaning or role. Therefore, the suffixes "module" and "unit" may be used interchangeably.

Figure 1A:
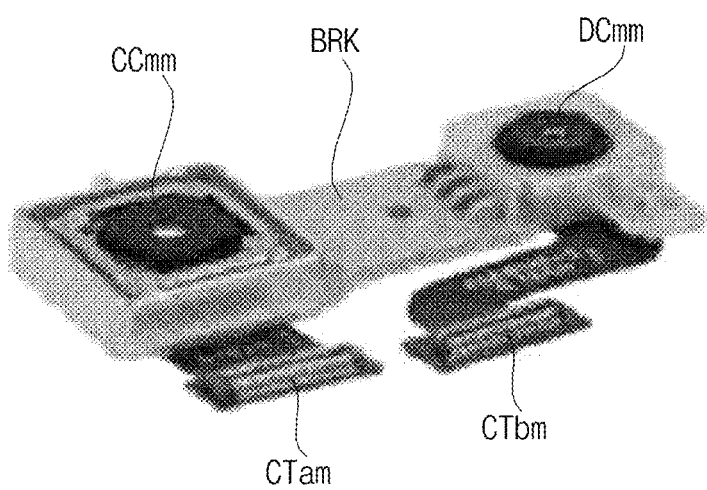
FIG. 1A is a diagram illustrating the appearance of a camera device related to the present disclosure.

FIG. 1A is a diagram illustrating the appearance of a camera device related to the present disclosure.

Referring to the drawing, an example is illustrated in which a camera device 100m includes a color camera CCmm, an IR camera DCmm, a bracket BRK for fixing the color camera CCmm and the IR camera DCmm, an interface CTam of the color camera CCmm, an interface CTbm of the IR camera DCmm.

Due to the bracket BRK for fixing the color camera CCmm and the IR camera DCmm in the camera device 100m according to FIG. 1A, there may be limitations in designing a space of the camera device 100m or an electronic apparatus in which the camera device 100m is mounted.

Figure 1B:
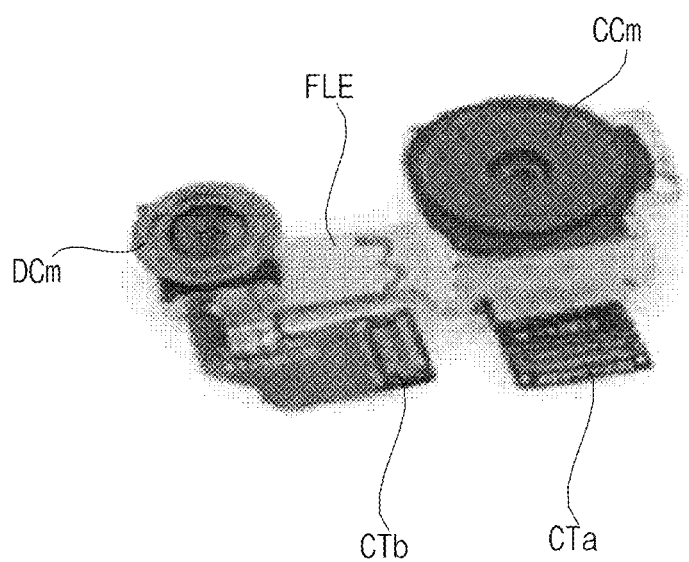
FIG. 1B is a diagram illustrating the appearance of a camera device according to an embodiment of the present disclosure.

FIG. 1B is a diagram illustrating the appearance of a camera device according to an embodiment of the present disclosure.

Referring to the drawing, an example is illustrated in which a camera device 100 includes a color camera CCm, an IR camera DCm, a connection member FLE for connecting the color camera CCm and the IR camera DCm, an interface CTa of the color camera CCm, and an interface CTb of the IR camera DCm.

Meanwhile, the connection member FLE for connecting the color camera CCm and the IR camera DCm may be flexible. That is, unlike FIG. 1A, the bracket BRK may not be provided. Accordingly, having no bracket, the camera device 100 or the electronic apparatus in which the camera device 100 is mounted may have an improved degree of freedom of design.

Meanwhile, in the camera device 100 of FIG. 1B, a distance between the color camera CCm and the IR camera DCm and the like may change irregularly, in which case calibration is required between a color image and an IR image. The calibration between the color image and the IR image will be described with reference to FIG. 6 and the following figures.

Meanwhile, the camera device 100 according to the embodiment of FIG. 1B of the present disclosure may be provided in various electronic apparatuses.

Figure 2:
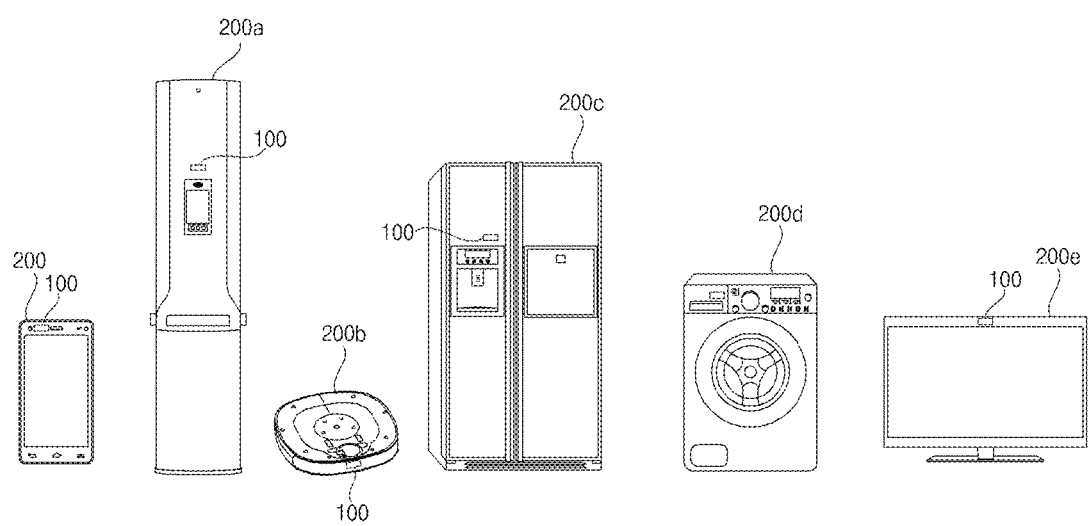
FIG. 2 is a diagram explaining various examples of an electronic apparatus.

FIG. 2 is a diagram explaining various examples of an electronic apparatus.

Referring to FIG. 2, the camera device 100 according to the embodiment of FIG. 1B of the present disclosure may be employed in a mobile terminal 200, an air conditioner 200a, a robot cleaner 200b, a refrigerator 200c, a washing machine 200d, a TV 200e, a vehicle, a drone, and the like.

The following description will be made based on the camera device 100 provided in the mobile terminal 200.

Figure 3A:
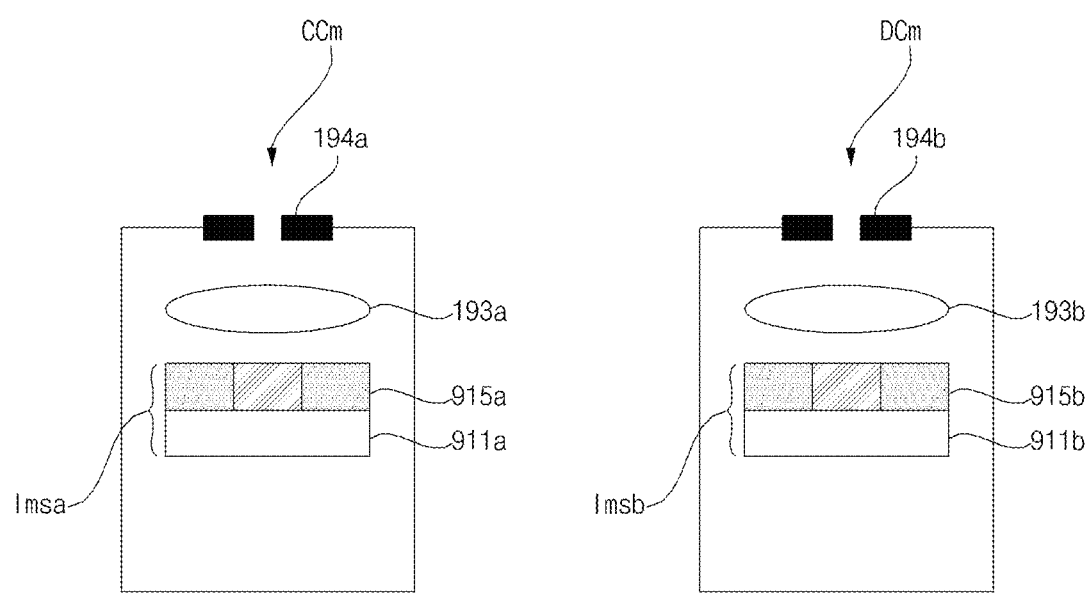
FIG. 3A is an internal cross-sectional view of a color camera and an IR camera of FIG. 1B.

FIG. 3A is an internal cross-sectional view of a color camera and an IR camera of FIG. 1B.

Referring to the drawing, the color camera CCm may include an aperture 194a, a lens device 193a, and an image sensor Imsa.

The aperture 194a may permit or prevent light incident upon the lens device 193a.

The lens device 193a may include a plurality of lenses which are adjusted for focus variation.

For sensing RGB colors, the image sensor Imsa may include a RGb filter 915a, and a sensor array 911a for converting an optical signal into an electrical signal.

Accordingly, the image sensor Imsa may sense and output a color image.

The IR camera DCm may include an aperture 194b, a lens device 193b, and an image sensor Imsb.

The aperture 194b may permit or prevent light incident upon the lens device 193b.

The lens device 193b may include a plurality of lenses which are adjusted for focus variation.

For sensing an IR image, the image sensor Imsb may include an IR filter 915b, and a sensor array 911a for converting an optical signal into an electrical signal.

Accordingly, the image sensor Imsb may sense and output an IR image.

Meanwhile, in addition to the color image, the color camera CCm may output images of various colors. For example, the color camera CCm may output a W color image, RGBY images, or the like.

Figure 3B:
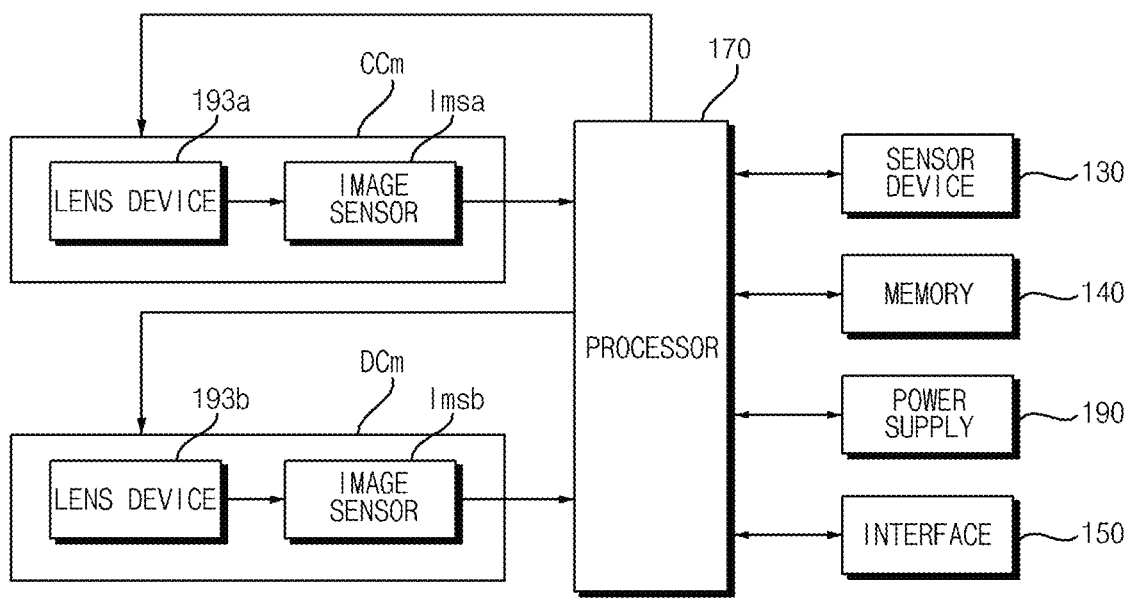
FIG. 3B is an internal block diagram of a camera device including the color camera and the IR camera of FIG. 1B.

FIG. 3B is an internal block diagram of a camera device including the color camera and the IR camera of FIG. 1B.

Referring to the drawing, the camera device 100 may include the color camera CCm, the IR camera DCm, a processor 170, a sensor device 130, a memory 140, a power supply 190, and an interface 150.

For outputting a color image, the color camera CCm may include the lens device 193a and the image sensor Imsa.

The lens device 193a in the color camera CCm may include a plurality of lenses which receive the incident light and are adjusted for focus variation.

Meanwhile, an exposure time of the image sensor Imsa may be adjusted based on an electronic signal.

For outputting an IR image, the IR camera DCm may include the lens device 193b and the image sensor Imsb.

The lens device 193b in the IR camera DCm may include a plurality of lenses which receive the incident light and are adjusted for focus variation.

Meanwhile, the processor 170 may receive the color image which is based on the electronic signal from the image sensor Imsa in the color camera CCm. Alternatively, the processor 170 may generate a color image based on the electronic signal from the image sensor Imsa in the color camera CCm.

Meanwhile, the processor 170 may receive the IR image which is based on the electronic signal from the image sensor Imsb in the IR camera DCm. Alternatively, the processor 170 may generate an IR image based on the electronic signal from the image sensor Imsb in the IR camera DCm.

Meanwhile, the processor 170 may calculate error information based on a difference between the color image, obtained from the color camera CCm, and the IR image from the IR camera DCm, and may compensate for at least one of the color image and the IR image based on the calculated error information and may output the compensated color image or the compensated IR image.

Meanwhile, by analyzing each feature point of the color image from the color camera CCm and the IR image from the IR camera, the processor 170 may calculate three-dimensional (3D) error information, and may compensate for at least one of the color image and the IR image based on the calculated 3D error information, to output the compensated color image or the compensated IR image.

Meanwhile, the processor 170 may upscale the IR image, may calculate 3D error information between the upscaled IR image and the color image, and may compensate for at least one of the color image and the IR image based on the calculated 3D error information, to output the compensated color image or the compensated IR image.

Meanwhile, by matching the compensated and upscaled IR image with the color image based on the calculated 3D error information, the processor 170 may output the compensated color image.

Meanwhile, by comparing a luminance component of a color image Imgr with a luminance component of the IR image Imgt, the processor 170 may calculate error information, and may compensate for at least one of the color image and the IR image based on the calculated error information to output the compensated color image or the compensated IR image.

The sensor device 130 may sense movement information, position information, or the like of the camera device 100. To this end, the sensor device 130 may include a GPS receiving unit, an inertial sensor (gyro sensor, acceleration sensor, etc.), and the like.

The memory 140 may store data for operation of the camera device 100 or the color image from the color camera CCm, the IR image from the IR camera DCm, or the compensated color image or the compensated IR image.

The interface 150 may be used for data transmission with other units of the camera device 100.

The power supply 190 may supply power for operation of the camera device 100.

For example, the power supply 190 may convert DC power or AC power input from an external source and may supply the converted DC power to the processor 170, the color camera CCm, the IR camera DCm, the sensor device 130, the memory 140, the interface 150, and the like.

FIGS. 4A to 5C are diagrams referred to in the description of an operation of the camera device of FIG. 3B.

Figure 4A:
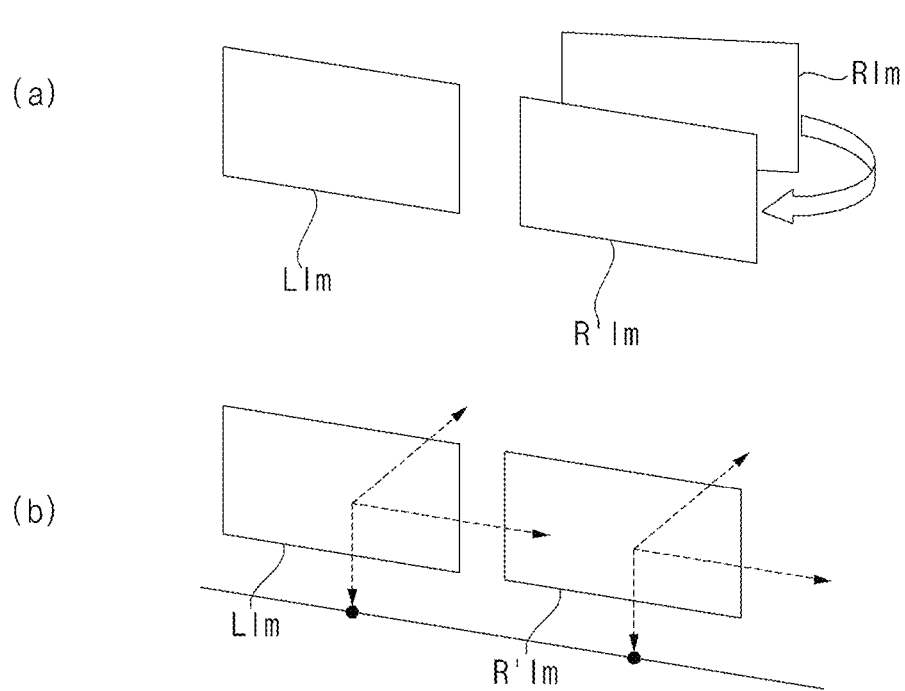

First, (a) of FIG. 4A illustrates an example of calibrating an IR image Rim due to a distortion between a color image Lim obtained from the color camera CCm and an IR image Rim obtained from the IR camera DCm. Specifically, (a) of FIG. 4A illustrates an IR image R'im obtained by compensating for the IR image Rim.

The compensated IR image Rim may be an image which is compensated based on at least one of 3D translation, 3D shift, and 3D rotation.

Here, the 3D rotation may include yaw, pitch, and roll rotations.

Then, (b) of FIG. 4A illustrates the color image Lim and the compensated IR image R'im which are aligned regularly. Accordingly, by matching the color image Lim with the compensated IR image R'im, the compensated color image or the compensated IR image may be output.

Figure 4B:
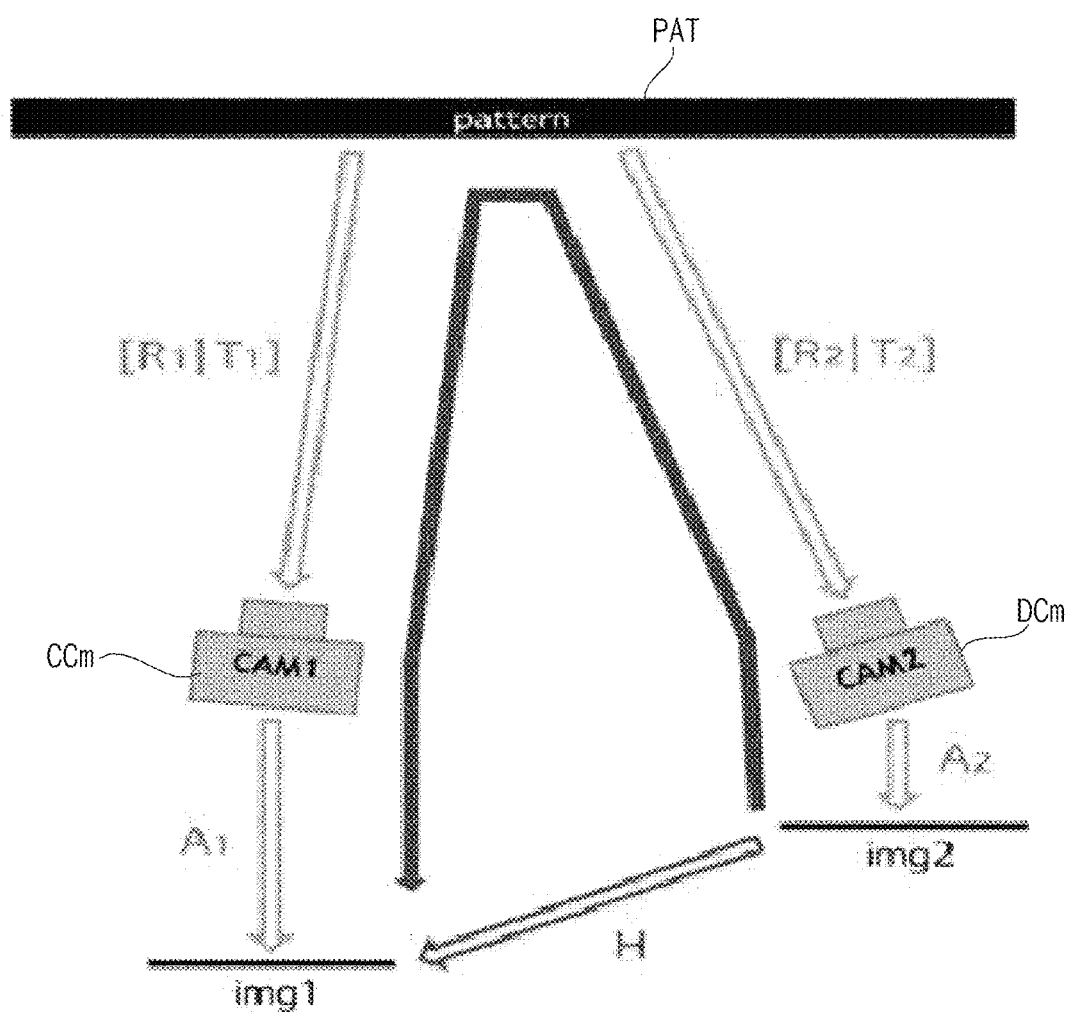

FIG. 4B illustrates an example of photographing the same pattern PAT by using the color camera CCm and the IR camera DCm.

A misalignment, such as [R1, T1., occurs due to the 3D rotation, 3D translation, and the like of the color camera CCm, such that a color image img1 is obtained from the color camera CCm.

Then, a misalignment, such as [R2, T2., occurs due to the 3D rotation, 3D translation, and the like of the IR camera DCm, such that an IR image img2 is obtained from the IR camera DCm.

Meanwhile, a difference between the color image img1 and the IR image img2 may be represented by a degree of distortion H.

Meanwhile, in order to minimize a difference between the color image img1 and the IR image img2, the processor 170 may calculate a degree of distortion H, which is a difference between the color image img1 and the IR image img2, misalignment information [R1, T1., such as rotation, translation, and the like of the color image img1, and misalignment information [R2, T2., such as rotation, translation, and the like of the IR image img2.

Further, based on the degree of distortion H, the misalignment information [R1, T1., such as rotation, translation, and the like of the color image img1, and the misalignment information [R2, T2., such as rotation, translation, and the like of the IR image img2, the processor 170 may output the compensated color image or the compensated IR image for reducing an error.

FIG. 5A illustrates a color image 510 obtained from the color camera CCm and an IR image 515 obtained from the IR camera DCm in the camera device 100.

If there is a difference in resolution between the color camera CCm and the IR camera DCm, a resolution of the color image 510 may be higher than a resolution of the IR image 515.

First, in order to perform calibration based on the difference between the color image 510 and the IR image 515, it is required to adjust the resolution of the color image 510 to be the same as the resolution of the IR image 515.

To this end, the processor 170 may upscale the IR image.

Alternatively, the processor 170 may upscale the IR image and may downscale the color image.

FIG. 5B illustrates a downscaled color image 520 and an upscaled IR image 525.

Meanwhile, when upscaling a low-resolution IR image, a blur and the like may occur according to a pattern included in the IR image.

Figure 5C:
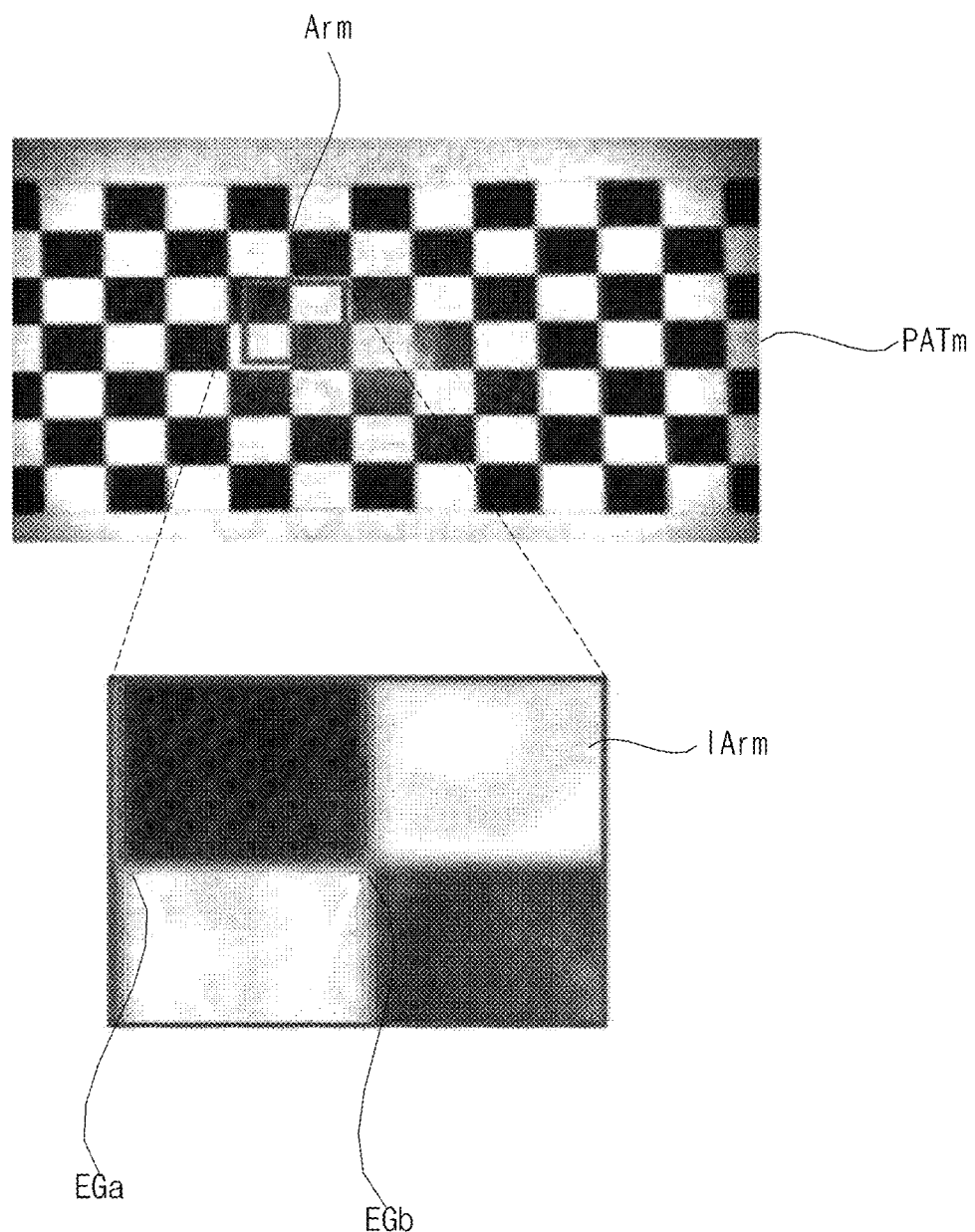

FIG. 5C illustrates an IR image IArm captured of an area Arm in a black-and-white square grid pattern.

In the IR image IArm, a blur may occur in boundaries EGa and EGb between black and white areas, and this phenomenon is more noticeable when the IR image is upscaled.

Figure 7:
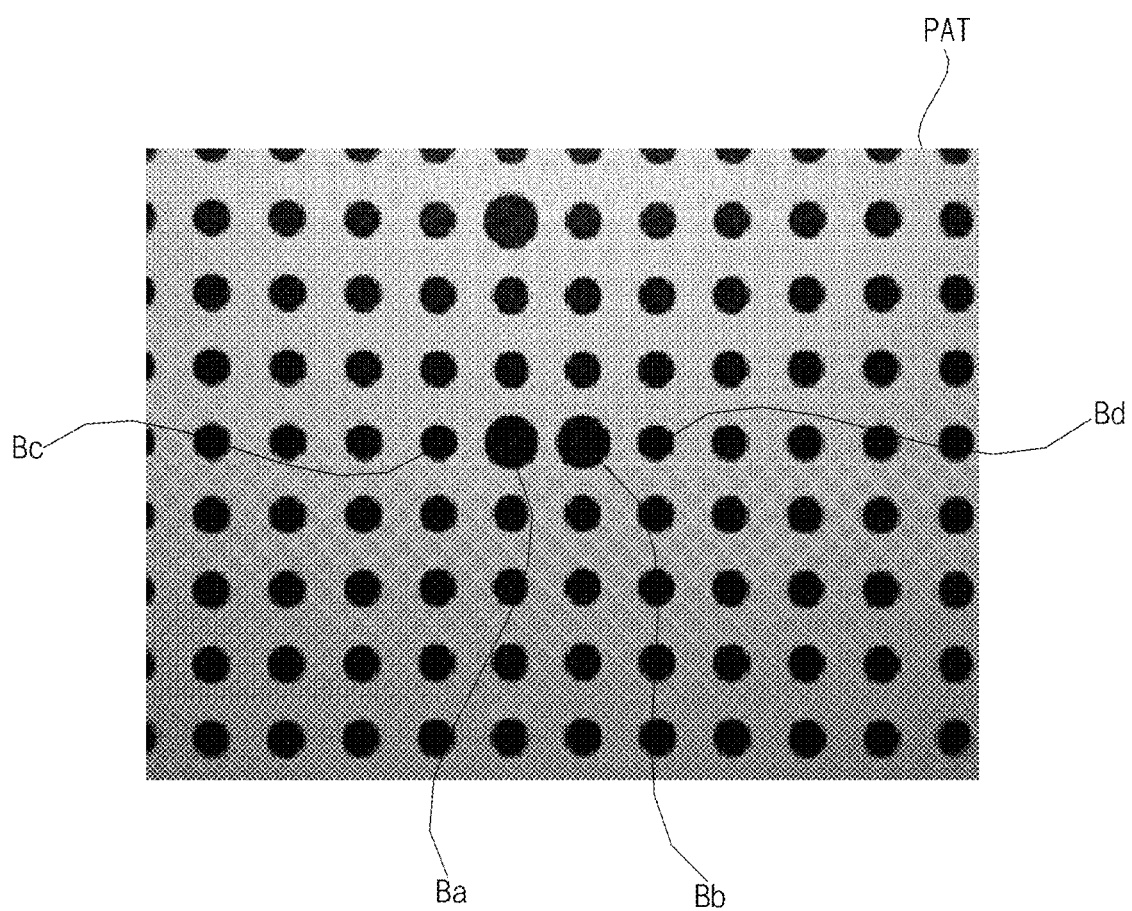
FIGS. 7 to 10F are diagrams referred to in the description of the operating method of FIG. 6.

Accordingly, a pattern used for calibration of the color camera CCm and the IR camera DCm is preferably a circular grid pattern as illustrated in FIG. 7, rather than a square grid pattern. Meanwhile, in order to determine a reference point and the like, a grid pattern of circles of a plurality of sizes may be preferable.

Figure 6:
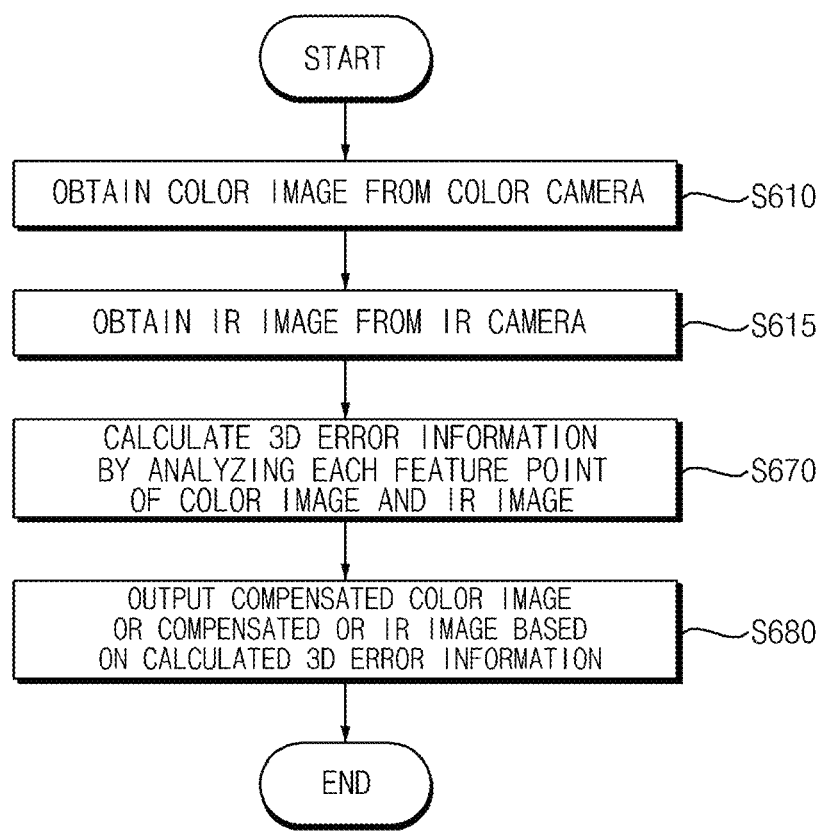
FIG. 6 is a flowchart illustrating an operating method of a camera device.

FIG. 6 is a flowchart illustrating an operating method of a camera device, and FIGS. 7 to 10F are diagrams referred to in the description of the operating method of FIG. 6.

First, referring to FIG. 6, the processor 170 in the camera device 100 obtains a color image from the color camera CCm (S610).

Then, the processor 170 in the camera device 100 obtains an IR image from the IR camera DCm (S615).

The obtained color image and IR image may be images captured of the same pattern or object.

For example, a color image and an IR image captured of a grid pattern PAT of circles of a plurality of sizes as illustrated in FIG. 7 may be obtained at a first time point.

In the grid pattern PAT of circles of a plurality of sizes illustrated in FIG. 7, circular patterns Ba and Bb of a first size are disposed at the center thereof, and circular patterns Bc and Bd of a second size are disposed around the circular patterns Ba and Bb of the first size In this case, the circular patterns may be in black or in colors, and a background color around the circular patterns may be white.

Figure 8A:
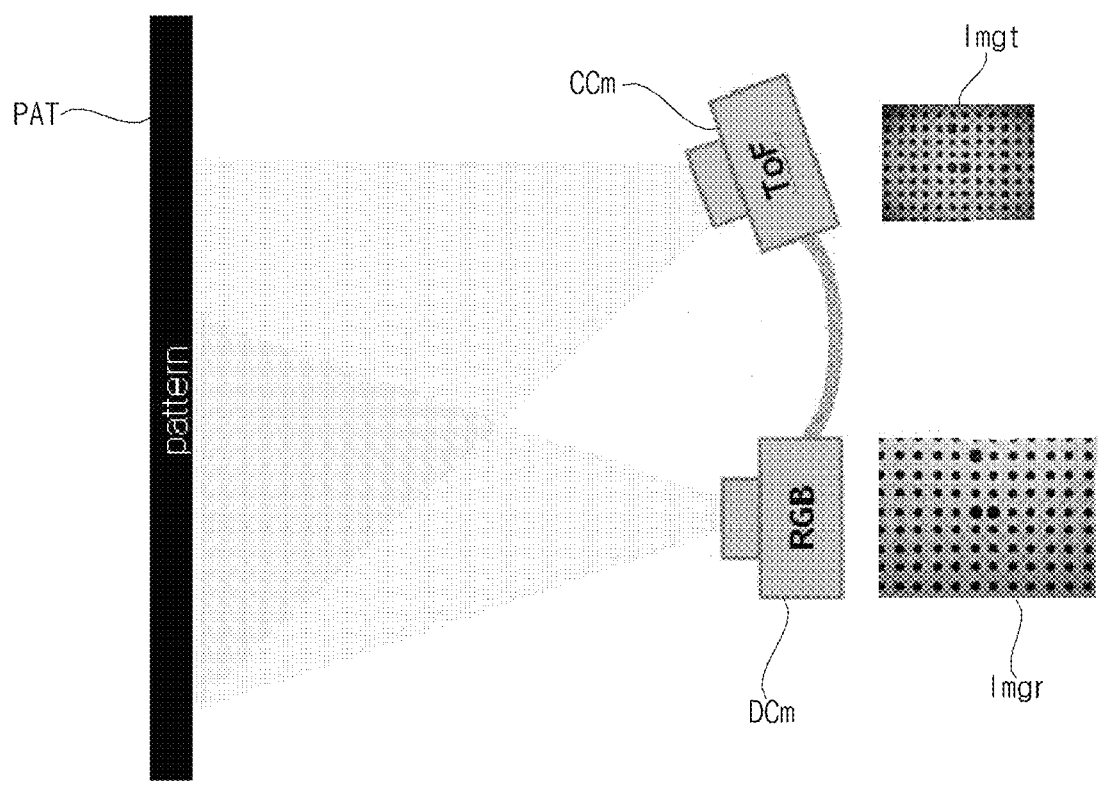
Figure 8B:
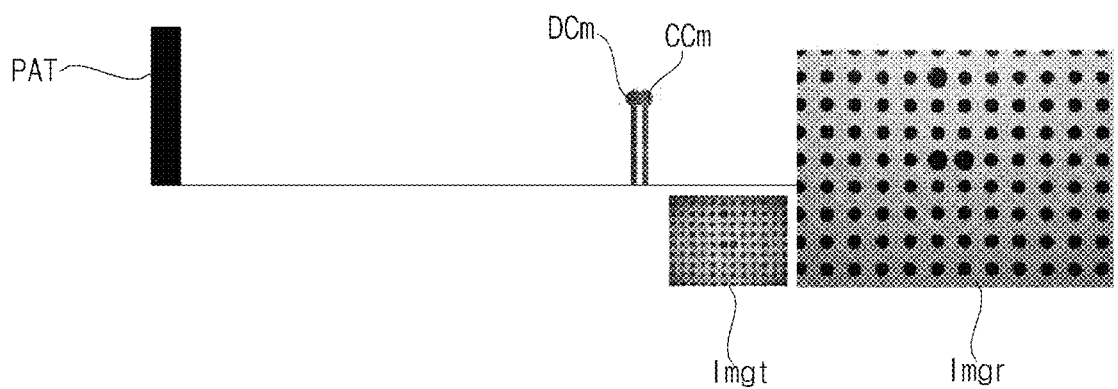

FIG. 8A illustrates a top view of the color camera CCm and the IR camera DCm capturing an image of the grid pattern PAT of circles of a plurality of sizes, and FIG. 8B illustrates a side view of the color camera CCm and the IR camera DCm capturing an image of the grid pattern PAT of circles of a plurality of sizes.

Referring to FIGS. 8A and 8B, the color camera CCm and the IR camera DCm are spaced apart from each other by a predetermined distance, in which the color camera CCm may acquire a color image Imgr, and the IR camera DCm may acquire an IR image Imgt, of the grid pattern PAT of circles of a plurality of sizes.

As described above, if there is a difference in resolution between the color camera CCm and the IR camera DCm, the processor 170 may perform upscaling and the like of the IR image Imgt.

Then, the processor 170 in the camera device 100 may calculate 3D error information by analyzing each feature point of the color image and the IR image (S670).

Subsequently, the processor 170 in the camera device 100 may output a compensated color image or a compensated IR image based on the calculated 3D error information (S680).

Meanwhile, the processor 170 may calculate error information based on the color image Imgr obtained from the color camera CCm and the IR image Imgt obtained from the IR camera DCm, and may compensate for at least one of the color image Imgr and the IR image Imgt based on the calculated error information to output the compensated color image or the compensated IR image. Accordingly, a difference between the color image Imgr from the color camera CCm and the IR image Imgt from the IR camera DCm may be compensated rapidly and accurately.

Meanwhile, by analyzing each feature point of the color image Imgr from the color camera CCm and the IR image Imgt from the IR camera DCm, the processor 170 may calculate 3D error information, and may compensate for at least one of the color image Imgr and the IR image Imgt based on the calculated 3D error information to output the compensated color image 540 or the compensated IR image Imgt. Particularly, based on the calculated 3D error information, the difference between the color image Imgr from the color camera CCm and the IR image Imgt from the IR camera DCm may be compensated rapidly and accurately.

Meanwhile, the processor 170 may upscale the IR image Imgt, may calculate 3D error information between the upscaled IR image Imgt and the color image Imgr, and may compensate for at least one of the color image Imgr and the IR image Imgt based on the calculated 3D error information to output the compensated color image or the compensated IR image. Accordingly, the difference between the color image Imgr from the color camera CCm and the IR image Imgt from the IR camera DCm may be compensated rapidly and accurately.

Meanwhile, the 3D error information may include relative rotation information, relative translation information, or relative shift information between the color image Imgr and the IR image Imgt. Accordingly, based on the relative rotation information, relative translation information, or relative shift information, the difference between the color image Imgr from the color camera CCm and the IR image Imgt from the IR camera DCm may be compensated rapidly and accurately.

Meanwhile, by matching the compensated and upscaled IR image Imgt with the color image Imgr based on the calculated 3D error information, the processor 170 may output a compensated color image. Accordingly, the difference between the color image Imgr from the color camera CCm and the IR image Imgt from the IR camera DCm may be compensated rapidly and accurately.

Meanwhile, by comparing a luminance component of the color image Imgr with a luminance component of the IR image Imgt, the processor 170 may calculate error information, and may compensate for at least one of the color image Imgr and the IR image Imgt based on the calculated error information to output the compensated color image or the compensated IR image. Accordingly, the difference between the color image Imgr from the color camera CCm and the IR image Imgt from the IR camera DCm may be compensated rapidly and accurately.

Figure 9:
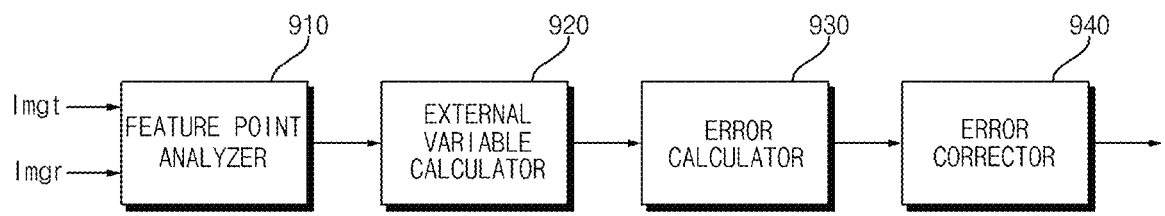

FIG. 9 illustrates an example of an internal block diagram of the processor 170.

Referring to the drawing, the processor 170 may include: a feature point analyzer 910 configured to analyze each feature point of the color image Imgr from the color camera CCm and the IR image Imgt from the IR camera DCm; an external variable calculator 920 configured to calculate an external variable based on each feature point information analyzed by the feature point analyzer 910; an error calculator 930 configured to calculate 3D error information based on the calculated external variable; and an error corrector 940 configured to correct an error based on the 3D error information. Accordingly, the difference between the color image Imgr from the color camera CCm and the IR image Imgt from the IR camera DCm may be compensated rapidly and accurately.

Figure 10A:
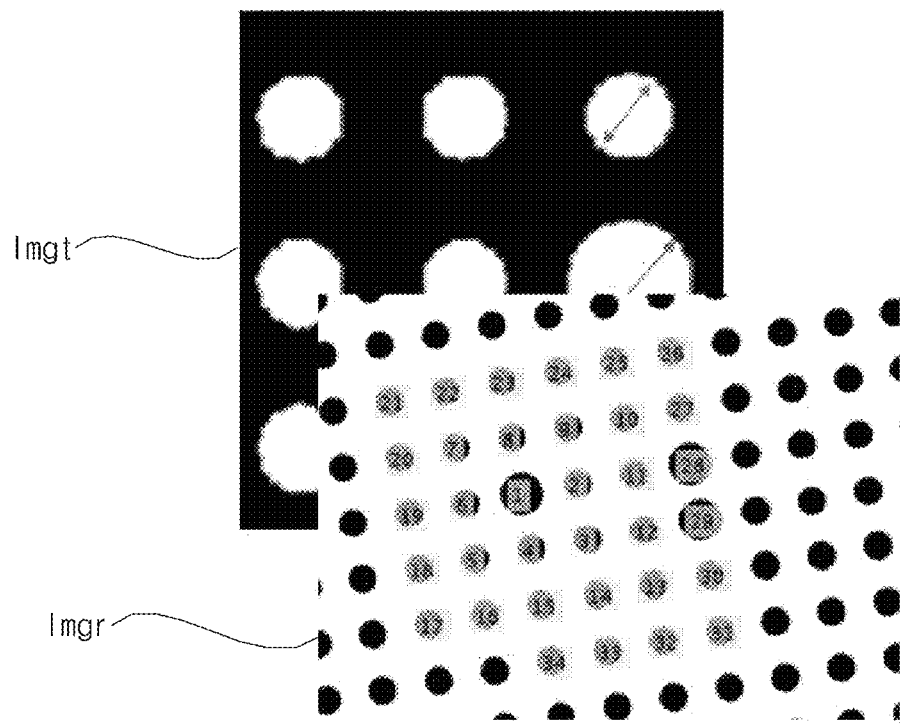

FIG. 10A illustrates the color image Imgr from the color camera CCm and the IR image Imgt from the IR camera DCm, which are input to the feature point analyzer 910.

Meanwhile, the feature point analyzer 910 may detect a pattern or a reference point from each of the color image Imgr from the color camera CCm and the IR image Imgt from the IR camera DCm, and may calculate a direction vector based on the detected pattern or reference point.

Meanwhile, the feature point analyzer 910 may detect a circular pattern from the color image Imgr and the IR image Imgt, and may detect a reference point in the circular pattern.

Meanwhile, the feature point analyzer 910 may calculate a direction vector based on the detected circular pattern or reference point.

Further, the feature point analyzer 910 may analyze the feature point based on the detected circular pattern or reference point, or the direction vector. That is, the feature point may include the circular pattern, the reference point, or the direction vector.

Meanwhile, based on each feature point information analyzed by the feature point analyzer 910, the external variable calculator 920 may calculate rotation information, translation information, or shift information of each of the color image Imgr and the IR image Imgt.

Meanwhile, the external variable calculator 920 may calculate a homography between the color image Imgr and the IR image Imgt.

Meanwhile, based on the calculated homography, the external variable calculator 920 may calculate the rotation information, the translation information, or the shift information of each of the color image Imgr and the IR image Imgt.

Meanwhile, based on the rotation information, the translation information, or the shift information of each of the color image Imgr and the IR image Imgt, the error calculator 930 may calculate relative rotation information, relative translation information, or relative shift information between the color image Imgr and the IR image Imgt.

Meanwhile, the error calculator 930 may calculate a reprojection error based on the color image Imgr and the IR image Imgt.

Figure 10B:
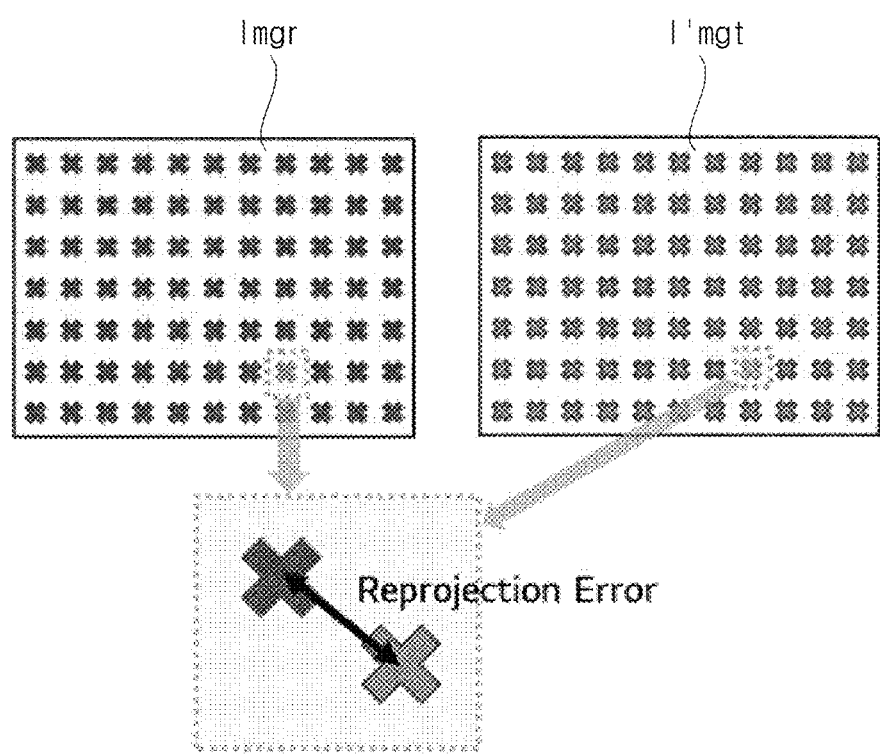

FIG. 10B illustrates an example of calculating a reprojection error based on the color image Imgr and a compensated IR image I'mgt.

The reprojection error information may include the above relative rotation information, relative translation information, or relative shift information.

Meanwhile, by matching the compensated and upscaled IR image Imgt with the color image Imgr based on the calculated 3D error information, the error corrector 940 may output a compensated color image. Accordingly, the difference between the color image Imgr from the color camera CCm and the IR image Imgt from the IR camera DCm may be compensated rapidly and accurately.

Meanwhile, the error corrector 940 may output the compensated color image or the compensated IR image based on the calculated 3D error information.

Figure 10C:
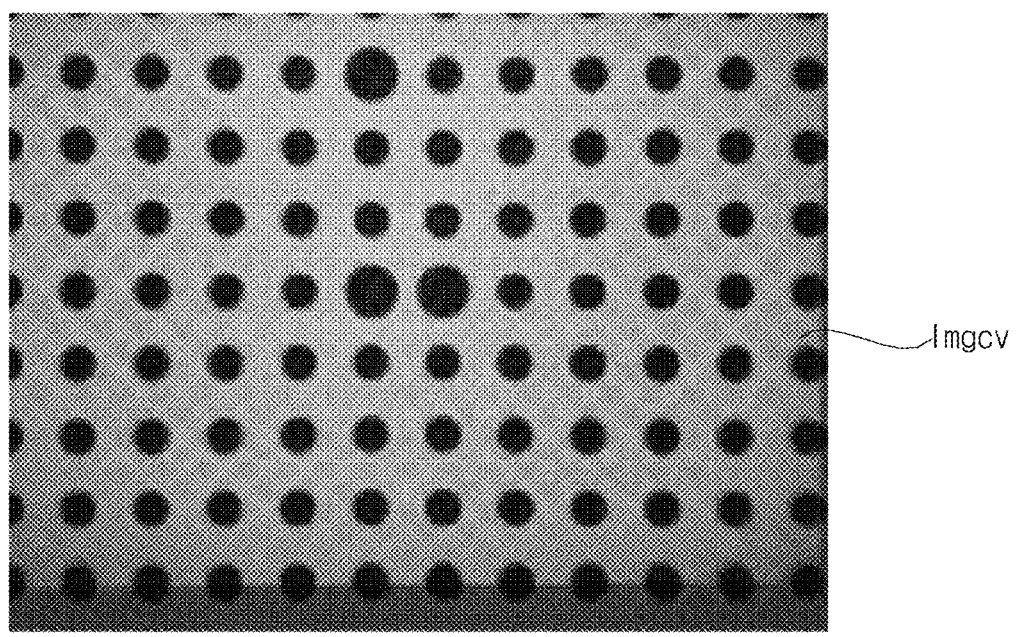

FIG. 10C illustrates an example of a compensated IR image Imgev.

Accordingly, the difference between the color image Imgr from the color camera CCm and the IR image Imgt from the IR camera DCm may be compensated rapidly and accurately.

FIG. 10D illustrates an example of another color image and another IR image.

Referring to the drawing, the processor 170 may receive a color image 510 from the color camera CCm of the camera device 100 and an IR image 515 from the IR camera DCm.

If there is a difference in resolution between the color camera CCm and the IR camera DCm, a resolution of the color image 510 may be higher than a resolution of the IR image 515, as illustrated in the drawing.

Accordingly, the processor 170 may downscale the color image 510 and may upscale the IR image 515.

Figure 10E:
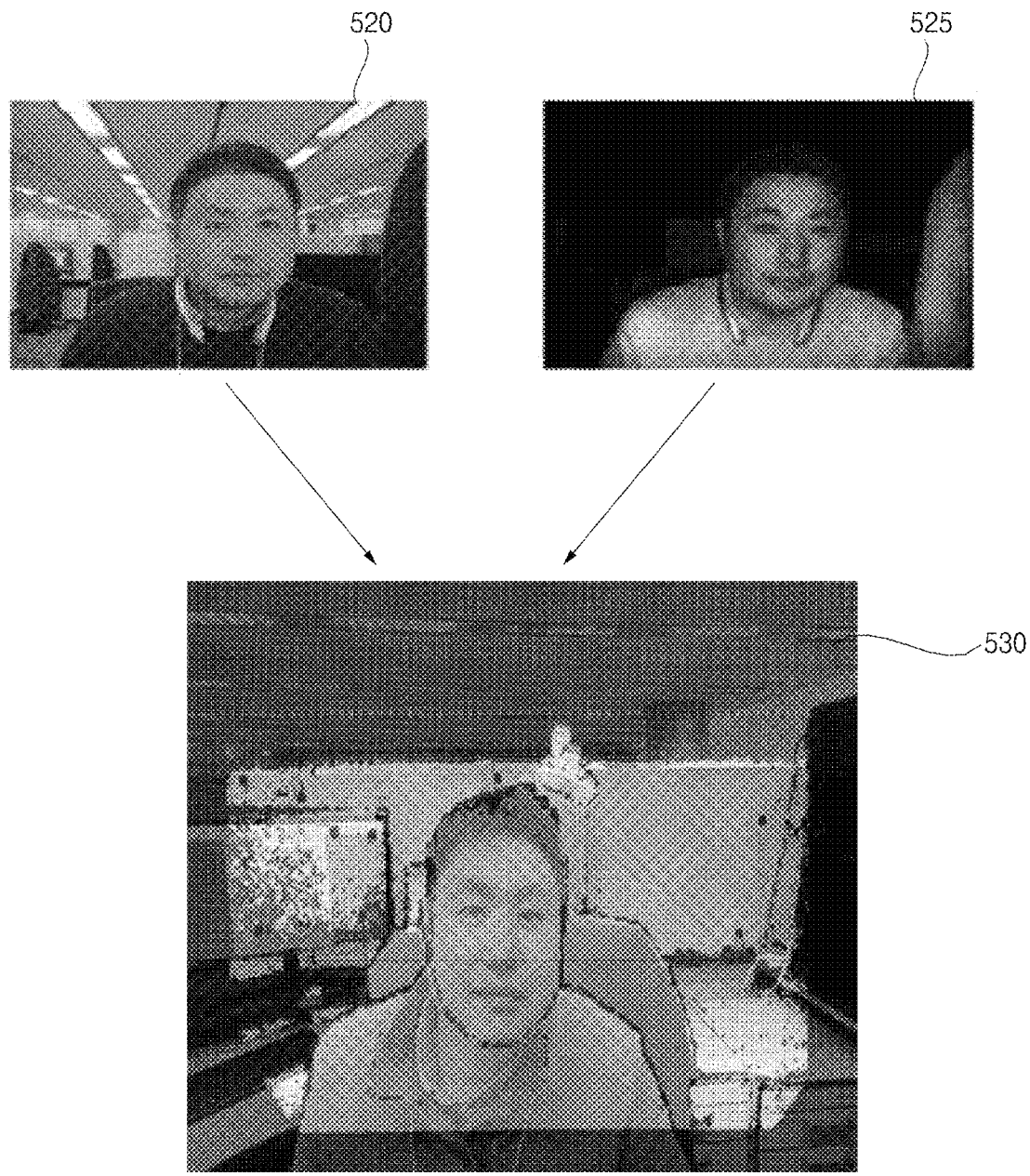

FIG. 10E illustrates a downscaled color image 520 and an upscaled IR image 525.

Meanwhile, the processor 170 may perform matching by using the downscaled color image 520 and the upscaled IR image 525.

For example, the processor 170 may match the upscaled IR image 525 to the downscaled color image 520. Further, the processor 170 may calculate error information based on the difference.

For example, by analyzing each feature point based on the downscaled color image 520 and the upscaled IR image 525, the processor 170 may calculate 3D error information.

Specifically, by analyzing each feature point based on the downscaled color image 520 and the upscaled IR image 525, the processor 170 may calculate 3D error information, such as the relative rotation information, relative translation information, or relative shift information, between the color image Imgr and the IR image Imgt.

In addition, the processor 150 may output the compensated color image or the compensated IR image based on the calculated 3D error information.

Figure 10F:

FIG. 10F illustrates an example of a compensated color image 540. Unlike the drawing, a compensated IR image may also be output.

Accordingly, the difference between the color image from the color camera and the IR image from the IR camera may be compensated rapidly and accurately.

Meanwhile, various effects may be obtained by combining the color image from the color camera and the IR image from the IR camera.

Meanwhile, a signal processing may be required to secure a dynamic range of the color image obtained from the camera device.

The present disclosure presents a method of generating a high dynamic range (HDR) color image based on the color image obtained from the color camera. This method is described with reference to FIG. 11 and the following drawings.

FIG. 11 is a diagram referred to in the description of the operation of the camera device according to an embodiment of the present disclosure.

Referring to the drawing, the image sensor Imsa in the color camera CCm in the camera device 100 according to an embodiment of the present disclosure may output a color pattern image using a red-green-blue (RGB) filter.

For example, the image sensor Imsa may output a color pattern image Ibggr using a red-green-green-blue (RGGB) filter of a 2*2 pattern. The color pattern image here may also be referred to as a Bayer pattern image.

Next, the processor 170 may be configured to perform the signal processing on the color pattern image Ibggr obtained from the image sensor Imsa, and then a high dynamic range (HDR) color image 311 to be output.

In particular, the processor 170 may be configured to receive a first color pattern image from the color camera CCm, generate a grayscale-based transmission map based on the first color pattern image, and generate a high dynamic range color image based on the grayscale-based transmission map. Accordingly, it is possible to generate the high dynamic range color image based on the color pattern image obtained from the color camera CCm.

Meanwhile, the processor 170 may be configured to generate the grayscale-based transmission map based on the first color pattern image, generate a second color pattern image based on the transmission map, and generate the high dynamic range color image based on the second color pattern image. Accordingly, it is possible to generate the high dynamic range color image based on the color pattern image obtained from the color camera CCm.

Meanwhile, the processor 170 may be configured to generate a grayscale-based luminance contrast map based on the first color pattern image or the transmission map, generate the second color pattern image based on the luminance contrast map and the transmission map, and generate the high dynamic range color image based on the second color pattern image. Accordingly, it is possible to generate the high dynamic range color image based on the color pattern image obtained from the color camera CCm.

Meanwhile, the processor 170 may be configured to generate grayscale-based first and second function characteristic maps based on the first color pattern image or the transmission map, generate a first function-based color pattern image and a second function-based color pattern image based on the first function characteristic map and the second function characteristic map, respectively, generate the second color pattern image based on the first function-based color pattern image and the second function-based color pattern image, and generate the high dynamic range color image based on the second color pattern image. Accordingly, it is possible to generate the high dynamic range color image based on the color pattern image obtained from the color camera CCm.

Meanwhile, the processor 170 may be configured to generate a transmission map-based color pattern image based on the transmission map, generate the second color pattern image based on the first function-based color pattern image, the second function-based color pattern image and the transmission map-based color pattern image, and generate the high dynamic range color image based on the second color pattern image. Accordingly, it is possible to generate the high dynamic range color image based on the color pattern image obtained from the color camera CCm.

Meanwhile, the processor 170 may be configured to perform luminance inversion on the first color pattern image, and generate the grayscale-based transmission map based on the luminance-inverted first color pattern image. Accordingly, it is possible to generate the high dynamic range color image may be generated based on the color pattern image obtained from the color camera CCm.

Meanwhile, the processor 170 may be configured to perform luminance inversion and amplification on the first color pattern image, and generate the grayscale-based transmission map based on the luminance-inverted and amplified first color pattern image. Accordingly, it is possible to generate the high dynamic range color image based on the color pattern image obtained from the color camera CCm.

Meanwhile, it is described in more detail with reference to FIG. 12 and the following drawings that the processor 170 is configured to generate the HDR image.

Figure 12:
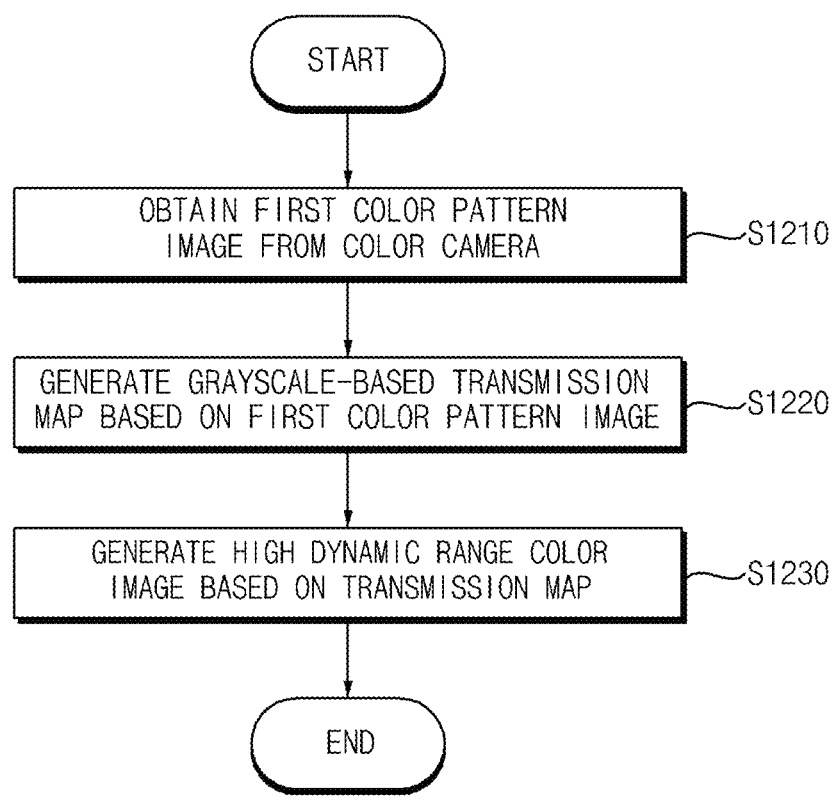
FIG. 12 is a flowchart illustrating an operation method of the camera device according to an embodiment of the present disclosure.

FIG. 12 is a flowchart illustrating an operation method of the camera device according to an embodiment of the present disclosure; and FIGS. 13 to 17 are diagrams referred to in the description of the operating method of FIG. 12.

Referring to FIG. 12, the processor 170 in the camera device 100 may be configured to obtain the first color pattern image from the color camera CCm (S1210). The Image sensor Imsa in the color camera CCm in the camera device 100 may output the first color pattern image using the RGB filter.

For example, the image sensor Imsa may output the color pattern image Ibggr using the red-green-green-blue (RGGB) filter of the 2*2 pattern. The first color pattern image here may also be referred to as the Bayer pattern image.

Next, the processor 170 in the camera device 100 may be configured to generate the grayscale-based transmission map based on the first color pattern image (S1220).

For example, the processor 170 in the camera device 100 may be configured to a color area to be removed from the first color pattern image and generate the grayscale-based transmission map based on a gray area.

Here, a resolution of the grayscale-based transmission map may be less than a resolution of the first color pattern image.

For example, the processor 170 in the camera device 100 may be configured to extract a 1*1 gray component from the 2*2 bggr component of the first color pattern image.

Next, the processor 170 in the camera device 100 may be configured to generate the high dynamic range color image based on the transmission map (S1230).

For example, the processor 170 in the camera device 100 may be configured to generate the second color pattern image based on the grayscale-based transmission map.

In addition, the processor 170 in the camera device 100 may be configured to generate the high dynamic range (HDR) color image based on the second color pattern image.

Figure 13:
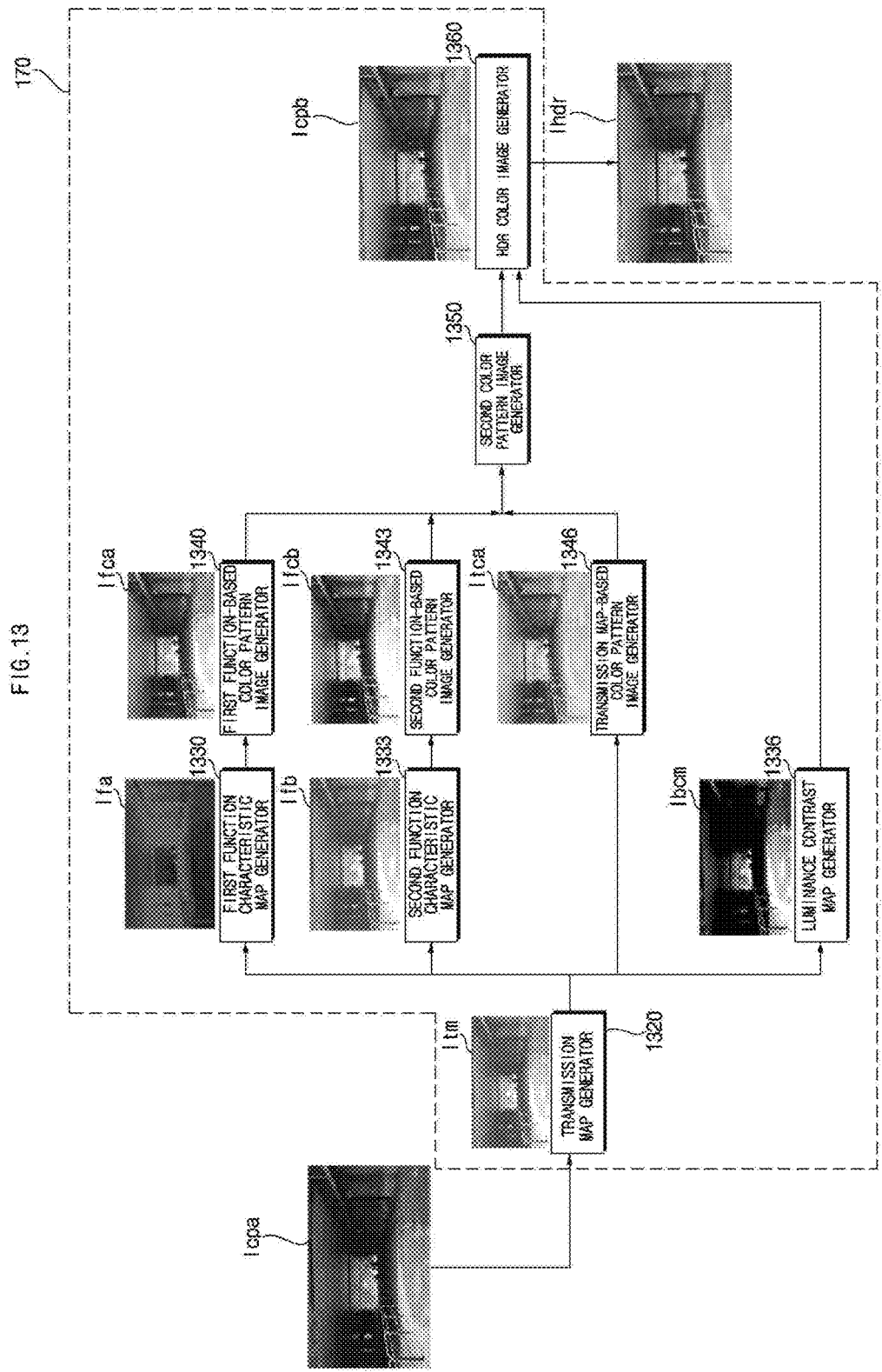

FIG. 13 is an example of an internal block diagram of the processor 170 according to an embodiment of the present disclosure.

Referring to the drawing, the processor 170 may include: a transmission map generator 1320, a first function characteristic map generator 1330, a second function characteristic map generator 1333, a luminance contrast map generator 1336, a first function-based color pattern image generator 1340, a second function-based color pattern image generator 1343, a second color pattern image generator 1350, a high dynamic range (HDR) color image generator 1360 and a transmission map-based color pattern image generator 1346.

The transmission map generator 1320 may generate the grayscale-based transmission map Itm based on the first color pattern image Icpa.

For example, the transmission map generator 1320 may remove the color area from the first color pattern image Icpa and generate a grayscale-based transmission map Itm based on the gray area.

Here, the resolution of the grayscale-based transmission map may be less than the resolution of the first color pattern image Icpa.

For example, the processor 170 in the camera device 100 may be configured to extract the 1*1 gray component from the 2*2 bggr component of the first color pattern image Icpa.

The transmission map-based color pattern image generator 1346 may generate a transmission map-based color pattern image Itca based on the transmission map Itm generated by the transmission map generator 1320.

Meanwhile, the luminance contrast map generator 1336 may generate a grayscale-based luminance contrast map Ibcm based on the first color pattern image Icpa or the transmission map Itm.

Meanwhile, the first function characteristic map generator 1330, the second function characteristic map generator 1333 may generate grayscale-based first and second function characteristic maps Ifa and Ifb, respectively, based on the first color pattern image Icpa or the transmission map Itm.

Here, the first function characteristic map Ifa may be an exponential property-based characteristic map.

Meanwhile, the second function characteristic map Ifb may be a square property-based characteristic map.

The first function-based color pattern image generator 1340 and the second function-based color pattern image generator 1343 may generate a first function-based color pattern image Ifca and a second function-based color pattern image Ifcb, respectively, based on the first function characteristic map Ifa and the second function characteristic map Ifb generated by the first function characteristic map generator 1330 and the second function characteristic map generator 1333, respectively.

The second color pattern image generator 1350 may generate a second color pattern image Icpb based on the first function-based color pattern image Ifca and the second function-based color pattern image Ifcb.

Meanwhile, the second color pattern image generator 1350 may generate the second color pattern image Icpb based on the first function-based color pattern image Ifca, the second function-based color pattern image Ifcb, and the transmission map-based color pattern image Itca generated by the transmission map-based color pattern image generator 1346.

The HDR color image generator 1360 may generate a high dynamic range color image Ihdr based on the second color pattern image Icpb.

Meanwhile, the HDR color image generator 1360 may generate the high dynamic range color image Ihdr based on the second color pattern image Icpb and the grayscale-based luminance contrast map Ibcm generated by the luminance contrast map generator 1336. Accordingly, it is possible to output the high dynamic range color image of an increased dynamic range.

Figure 14:
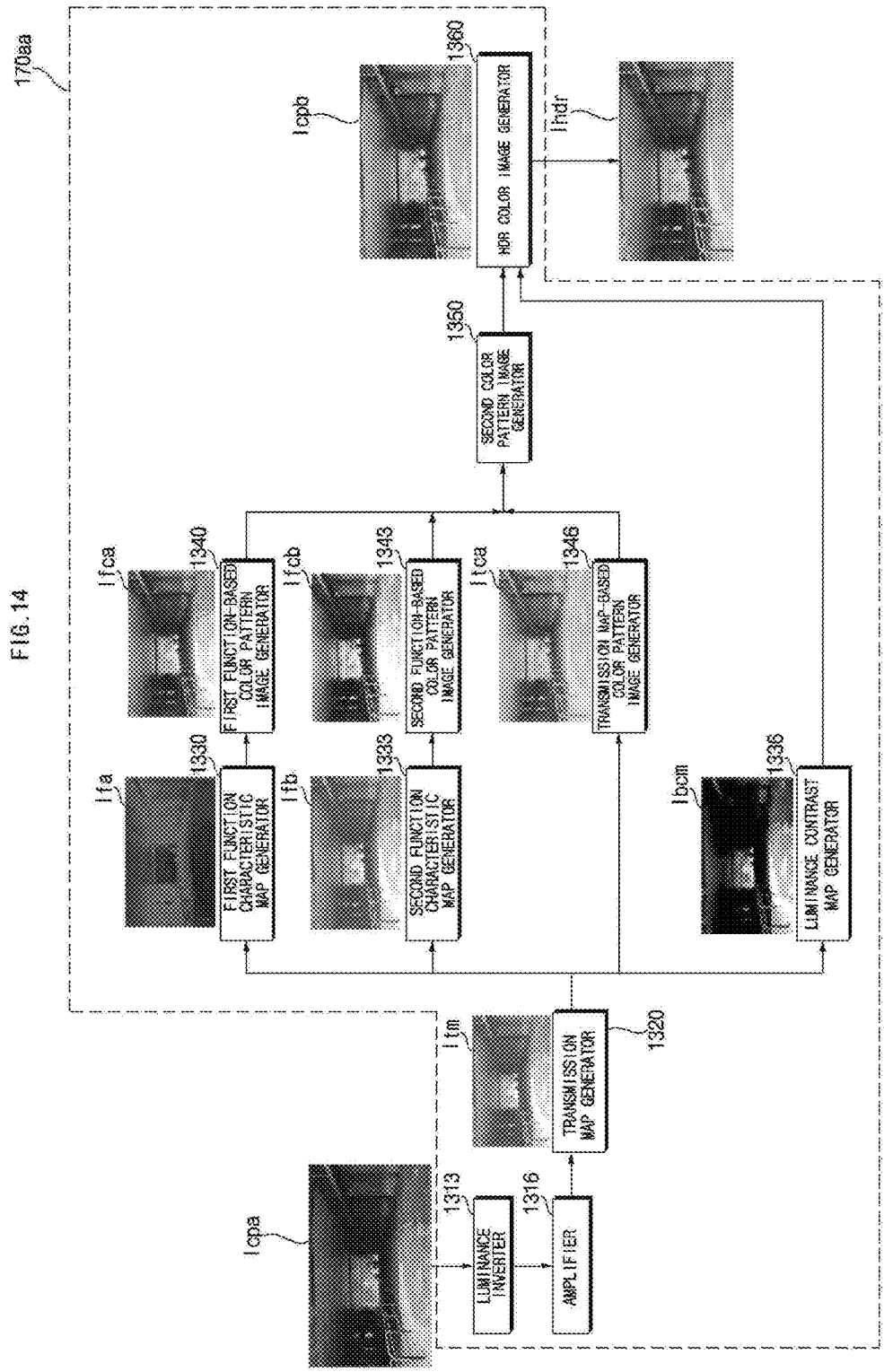

FIG. 14 is an example of an internal block diagram of a processor 170aa according to another embodiment of the present disclosure.

Referring to the drawing, like the processor 170 of FIG. 13, the processor 170aa of FIG. 14 may include the transmission map generator 1320, the first function characteristic map generator 1330, the second function characteristic map generator 1333, the luminance contrast map generator 1336, the first function-based color pattern image generator 1340, the second function-based color pattern image generator 1343, the second color pattern image generator 1350, the HDR color image generator 1360 and the transmission map-based color pattern image generator 1346.

Meanwhile, unlike the processor 170 of FIG. 13, the processor 170aa of FIG. 14 may further include a luminance inverter 1313 and an amplifier 1316. The following description focuses on this difference.

The luminance inverter 1313 may perform the luminance inversion on the first color pattern image Icpa.

For example, the luminance inverter 1313 may perform the luminance inversion at a luminance level of 60 among the luminance levels of zero to 255.

As another example, the luminance inverter 1313 may perform the luminance inversion at a luminance level of 127 among the luminance levels of zero to 255.

Next, the amplifier 1316 may amplify the luminance-inverted first color pattern image Icpa using an amplification factor.

In addition, the transmission map generator 1320 may generate the grayscale-based transmission map Itm based on the first color pattern image Icpa processed by the luminance inverter 1313 and the amplifier 1316. The remaining processes may be the same as those described in the description of FIG. 13.

As a result, the processor 170aa of FIG. 14 may generate the high dynamic range color image Ihdr. Accordingly, it is possible to output the high dynamic range color image of an increased dynamic range.

FIG. 15A (a) illustrates a color image 1510 obtained from the color camera CCm, and FIG. 15A (b) illustrates a high dynamic range color image 1515 of an increased dynamic range by the processing in the processor 170.

It may be seen that a dynamic range of the color image 1515 of FIG. 15A (b) is increased compared to that of FIG. 15A (a).

FIG. 15B (a) illustrates a color image 1520 obtained from the color camera CCm, and FIG. 15B (b) illustrates a high dynamic range color image 1525 of an increased dynamic range by the processing in the processor 170.

It may be seen that the dynamic range of the color image 1525 of FIG. 15B (b) is increased compared to that of FIG. 15B (a). In particular, it may be seen that the dynamic range of the image of a low-light area is improved.

FIG. 15C (a) illustrates a color image 1530 obtained from the color camera CCm, and FIG. 15C (b) illustrates a high dynamic range color image 1535 of an increased dynamic range by the processing in the processor 170.

It may be seen that the dynamic range of the color image 1535 of FIG. 15C (b) is increased compared to that of FIG. 15C (a).

FIG. 15D (a) illustrates a color image 1540 obtained from the color camera CCm, and FIG. 15D (b) illustrates a high dynamic range color image 1545 of an increased dynamic range by the processing in the processor 170.

It may be seen that the dynamic range of the color image 1545 of FIG. 15D (b) is increased compared to that of FIG. 15D (a). In particular, it may be seen that the dynamic range of a low-light area is improved.

Figure 16:
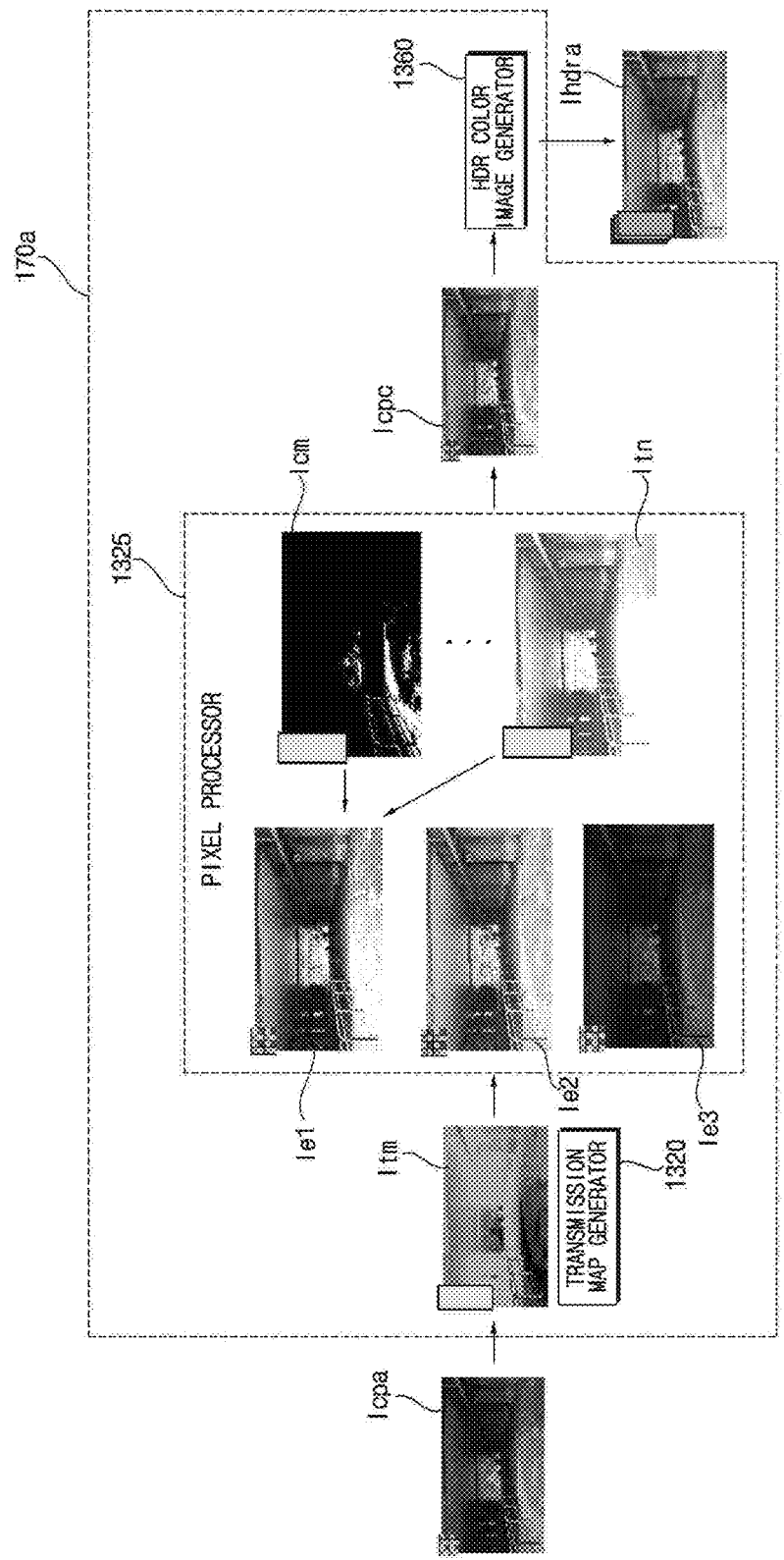

FIG. 16 is an example of an internal block diagram of a processor 170a according to yet another embodiment of the present disclosure.

Referring to the drawing, the processor 170a of FIG. 16 may include the transmission map generator 1320, a pixel processor 1325 and the high dynamic range (HDR) color image generator 1360.

Meanwhile, unlike the processor 170 of FIG. 13, the processor 170aa of FIG. 14 may further include the luminance inverter 1313 and the amplifier 1316. The following description focuses on this difference.

The transmission map generator 1320 may generate the grayscale-based transmission map Itm based on the first color pattern image Icpa.

For example, the transmission map generator 1320 may remove the color area from the first color pattern image Icpa and generate the grayscale-based transmission map Itm based on the gray area.

Here, the resolution of the grayscale-based transmission map may be less than the resolution of the first color pattern image Icpa.

The pixel processor 1325 may generate a plurality of pattern images Ie1, Ie2 and Ie3 having different exposure times based on the transmission map Itm and a compensation map Icm.

In addition, the pixel processor 1325 may generate a second color pattern image Icpc based on the plurality of pattern images Ie1, Ie2 and Ie3 having different exposure times.

Meanwhile, the HDR color image generator 1360 may generate a high dynamic range color image Ihdra based on the plurality of pattern images Ie1, Ie2 and Ie3 having different exposure times. Accordingly, it is possible to generate the high dynamic range color image Ihdra based on the color pattern image obtained from the color camera CCm.

In particular, the HDR color image generator 1360 may generate the high dynamic range color image Ihdra based on the second color pattern image Icpc generated based on the plurality of pattern images Ie1, Ie2 and Ie3 having different exposure times. Accordingly, it is possible to generate the high dynamic range color image Ihdra based on the color pattern image obtained from the color camera CCm.

Meanwhile, the pixel processor 1325 in the processor 170 may process the plurality of pattern images Ie1, Ie2 and Ie3 pixel-by-pixel when the pattern images are generated. Accordingly, it is possible to generate the high dynamic range color image Ihdra based on the color pattern image obtained from the color camera CCm.

Figure 17:
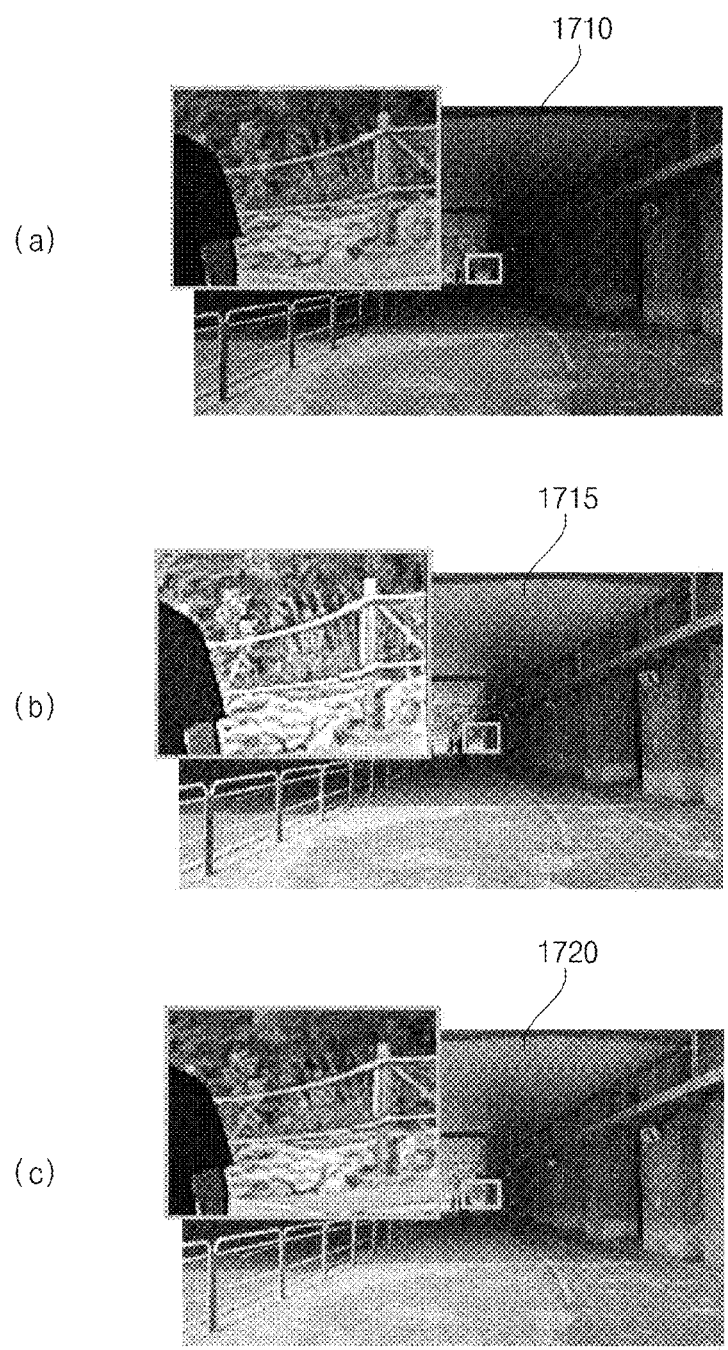

FIG. 17 is a diagram referred to in the description of FIG. 16.

FIG. 17 (a) illustrates an image 1710 corresponding to the first color pattern image Icpa input to the processor 170.

FIG. 17 (b) illustrates an image 1715 corresponding to the second color pattern image Icpc output from the pixel processor 1325.

FIG. 17 (c) illustrates an image 1720 corresponding to the HDR image Ihdra output from the HDR color image generator 1360 in the processor 170. Accordingly, the dynamic range of the image 1720 may be improved.

Figure 18:
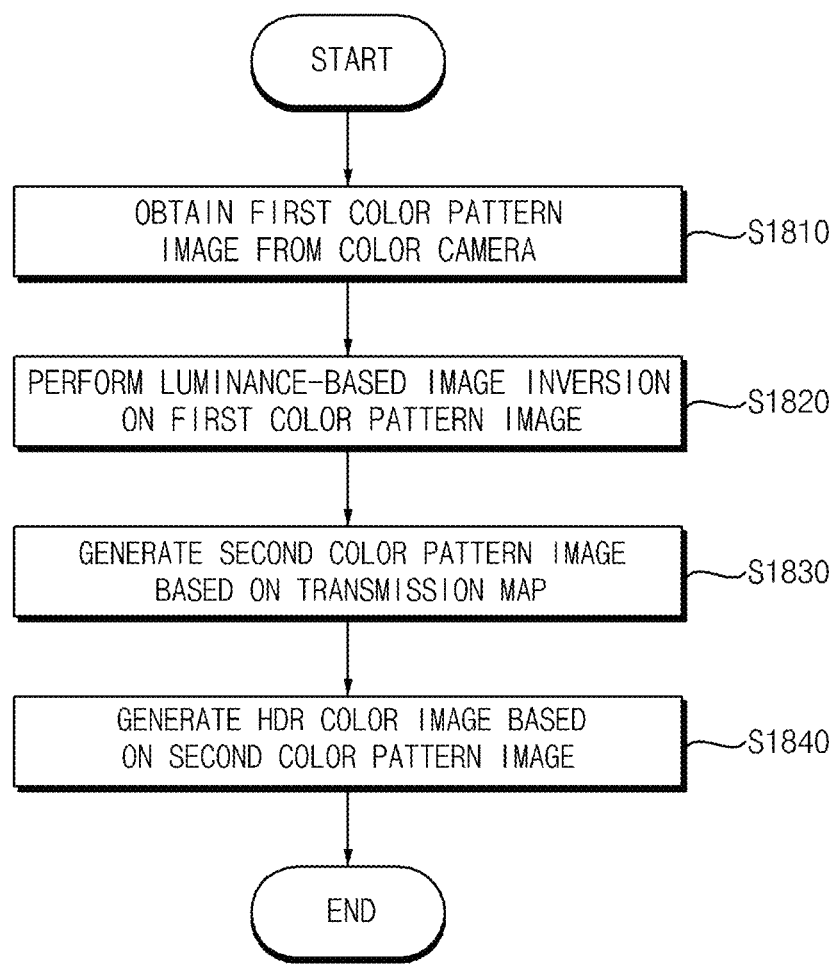
FIG. 18 is a flowchart illustrating an operating method of a camera device according to another embodiment of the present disclosure.
Figure 19:
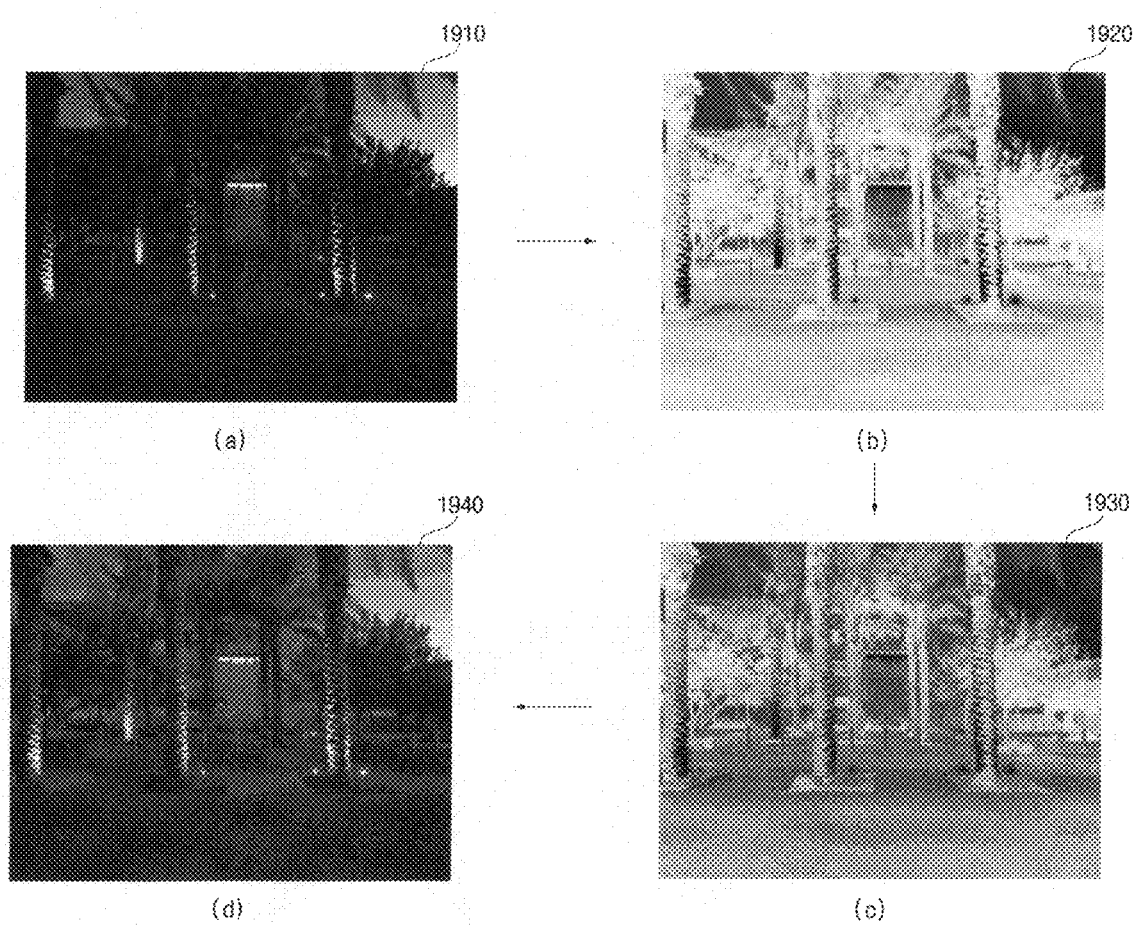
FIG. 19 is a diagram referred to in the description of the operating method of FIG. 18.

FIG. 18 is a flowchart illustrating an operating method of a camera device according to another embodiment of the present disclosure; and FIG. 19 is a diagram referred to in the description of the operating method of FIG. 18.

Referring to FIG. 18, a processor 170 in a camera device 100 may be configured to obtain a first color pattern image from a color camera CCm (S1810).

An Image sensor Imsa in the color camera CCm in the camera device 100 may output the first color pattern image using a red-green-blue (RGB) filter.

For example, the image sensor Imsa may output a first color pattern image Ibggr using a red-green-green-blue (RGGB) filter of a 2*2 pattern. The first color pattern image here may also be referred to as a Bayer pattern image.

Next, the processor 170 in the camera device 100 may be configured to perform luminance-based image inversion on the first color pattern image (S1820).

Next, the processor 170 in the camera device 100 may be configured to generate a second color pattern image based on a grayscale-based transmission map (S1830).

Next, the processor 170 in the camera device 100 may be configured to generate a high dynamic range color image based on the second color pattern image (S1840).

That is, the processor 170 may be configured to receive a first color pattern image Icpa from the color camera CCm, perform luminance inversion on the first color pattern image Icpa, and generate a high dynamic range color image based on the luminance-inverted first color pattern image. Accordingly, it is possible to generate the high dynamic range color image based on the color pattern image obtained from the color camera CCm.

Meanwhile, the processor 170 may be configured to perform grayscale-based transmission based on the luminance-inverted first color pattern image, perform luminance inversion again on the transmitted first color pattern image Icpa, and generate the high dynamic range color image. Accordingly, it is possible to generate the high dynamic range color image based on the color pattern image obtained from the color camera CCm.

Meanwhile, the processor 170 may be configured to perform grayscale-based transmission based on the luminance-inverted first color pattern image, perform luminance inversion again on the transmitted first color pattern image Icpa, and generate the second color pattern image by performing the transmission, and generate the high dynamic range color image based on the second color pattern image. Accordingly, it is possible to generate the high dynamic range color image based on the color pattern image obtained from the color camera CCm.

FIG. 19 (*a*) illustrates an image 1910 corresponding to the first color pattern image, and FIG. 19 (*b*) illustrates a luminance-inverted first color pattern image 1920. Accordingly, black color may be inverted to white color, etc.

The processor 170 may be configured to perform luminance inversion on the first color pattern image Icpa.

For example, the processor 170 may be configured to perform luminance inversion at a luminance level of 60 among the luminance levels of zero to 255.

As another example, the processor 170 may be configured to perform luminance inversion at a luminance level of 127 among the luminance levels of zero to 255.

FIG. 19 (*c*) illustrates an image 1930 generated by transmitting the image 1920 of FIG. 19B. Accordingly, a white color area may be reduced.

FIG. 19 (*d*) illustrates a luminance-inverted image 1940 generated by performing the luminance inversion again on the image 1930 of FIG. 19 (*c*).

Accordingly, in the image 1940 of FIG. 19 (*d*), a bright area may be maintained, and a dark area may become brighter, compared to the image 1910 of FIG. 19 (*a*). Accordingly, the dynamic range of the image of a low gradation area may be improved, and the high dynamic range color image may be generated as a whole.

While the present disclosure has been particularly shown and described with reference to preferred embodiments thereof, it will be understood by those skilled in the art that the present disclosure is not limited to those embodiments and various changes in form and details may be made therein without departing from the scope and spirit of the present disclosure as defined by the appended claims and should not be individually understood from the technical spirit or prospect of the present disclosure.

What is claimed is:

1. A camera device comprising:
   a color camera; and
   a processor configured to receive a first color pattern image from the color camera, generate a grayscale-based transmission map based on the first color pattern image, and generate a high dynamic range color image based on the grayscale-based transmission map,
   wherein the processor is configured to:
   generate the grayscale-based transmission map based on the first color pattern image,
   generate a grayscale-based luminance contrast map based on the first color pattern image or the grayscale-based transmission map,
   generate a second color pattern image based on the grayscale-based luminance contrast map and the grayscale-based transmission map, and
   generate the high dynamic range color image based on the second color pattern image.

2. The camera device of claim 1, wherein the processor is configured to:
   generate grayscale-based first and second function characteristic maps based on the first color pattern image or the grayscale-based transmission map,
   generate a first function-based color pattern image and a second function-based color pattern image based on the first function characteristic map and the second function characteristic map, respectively,
   generate the second color pattern image based on the first function-based color pattern image and the second function-based color pattern image, and
   generate the high dynamic range color image based on the second color pattern image.

3. The camera device of claim 2, wherein the processor is configured to:
   generate a grayscale-based transmission map-based color pattern image based on the grayscale-based transmission map,
   generate the second color pattern image based on the first function-based color pattern image, the second function-based color pattern image and the grayscale-based transmission map-based color pattern image, and
   generate the high dynamic range color image based on the second color pattern image.

4. The camera device of claim 1, wherein the processor is configured to:
   perform luminance inversion on the first color pattern image, and
   generate the grayscale-based transmission map based on the luminance-inverted first color pattern image.

5. The camera device of claim 1, wherein the processor is configured to:
   perform luminance inversion and amplification on the first color pattern image, and
   generate the grayscale-based transmission map based on the luminance-inverted and amplified first color pattern image.

6. The camera device of claim 1, wherein a resolution of the grayscale-based transmission map is less than a resolution of the first color pattern image.

7. The camera device of claim 1, wherein the processor includes:
   a transmission map generator configured to generate the grayscale-based transmission map based on the first color pattern image;
   a first function characteristic map generator and a second function characteristic map generator configured to generate grayscale-based first and second function characteristic maps, respectively, based on the first color pattern image or the grayscale-based transmission map;
   a first function-based color pattern image generator and a second function-based color pattern image generator configured to generate a first function-based color pattern image and a second function-based color pattern image, respectively, based on the first function characteristic map and the second function characteristic map;

a second color pattern image generator configured to generate the second color pattern image based on the first function-based color pattern image and the second function-based color pattern image; and a high dynamic range (HDR) color image generator configured to generate the high dynamic range color image based on the second color pattern image.

8. The camera device of claim 7, wherein the processor further includes a transmission map-based color pattern image generator configured to generate a grayscale-based transmission map-based color pattern image based on the grayscale-based transmission map, wherein the second color pattern image generator generates the second color pattern image based on the first function-based color pattern image, the second function-based color pattern image and the grayscale-based transmission map-based color pattern image, and wherein the HDR color image generator generates the high dynamic range color image based on the second color pattern image.

9. The camera device of claim 1, wherein the processor includes:

a transmission map generator configured to receive the first color pattern image from the color camera and generate the grayscale-based transmission map based on the first color pattern image;

a pixel processor configured to perform a signal processing on a pattern image pixel-by-pixel based on the grayscale-based transmission map and a compensation map, and generate a plurality of pattern images having different exposure times;

a second color pattern image generator configured to generate the second color pattern image based on the plurality of pattern images having different exposure times; and a high dynamic range (HDR) color image generator configured to generate the high dynamic range color image based on the second color pattern image.

10. The camera device of claim 1, further comprising an infrared (IR) camera, wherein the processor is configured to compensate at least one of the high dynamic range color image or an IR image for based on the high dynamic range color image and the IR image obtained from the IR camera.

11. The camera device of claim 10, wherein the color camera and the IR camera are connected to each other by a connection member, and wherein the connection member is flexible.

12. A camera device comprising:

a color camera; and a processor configured to receive a first color pattern image from the color camera, generate a grayscale-based transmission map based on the first color pattern image, and generate a high dynamic range color image based on the grayscale-based transmission map, wherein the processor is configured to:

receive the first color pattern image from the color camera, generate the grayscale-based transmission map based on the first color pattern image, generate a plurality of pattern images having different exposure times based on the grayscale-based transmission map and a compensation map, generate a second color pattern image based on the plurality of pattern images having different exposure times, and generate the high dynamic range color image based on the second color pattern image.

13. The camera device of claim 12, wherein the processor is configured to process each of the plurality of pattern images by pixel-by-pixel when the plurality of pattern images are generated.

14. An electronic apparatus comprising a camera, wherein the camera comprises:

a color camera; and a processor configured to receive a first color pattern image from the color camera, generate a grayscale-based transmission map based on the first color pattern image, and generate a high dynamic range color image based on the grayscale-based transmission map, and wherein the processor is configured to:

generate the grayscale-based transmission map based on the first color pattern image, generate a grayscale-based luminance contrast map based on the first color pattern image or the grayscale-based transmission map, generate a second color pattern image based on the grayscale-based luminance contrast map and the grayscale-based transmission map, and generate the high dynamic range color image based on the second color pattern image.

* * * * *